(12) United States Patent
Ono

(10) Patent No.: US 8,277,696 B2
(45) Date of Patent: Oct. 2, 2012

(54) THERMOCHROMIC COLOR-MEMORY COMPOSITION, AND THERMOCHROMIC COLOR-MEMORY MICROCAPSULE PIGMENT HAVING THE COMPOSITION ENCAPSULATED THEREIN

(75) Inventor: Yoshiaki Ono, Aichi (JP)

(73) Assignee: The Pilot Ink Co., Ltd., Aichi (JP)

( * ) Notice: Subject to any disclaimer, the term of this patent is extended or adjusted under 35 U.S.C. 154(b) by 0 days.

(21) Appl. No.: 13/320,223

(22) PCT Filed: May 12, 2010

(86) PCT No.: PCT/JP2010/058059
§ 371 (c)(1),
(2), (4) Date: Nov. 11, 2011

(87) PCT Pub. No.: WO2010/131684
PCT Pub. Date: Nov. 18, 2010

(65) Prior Publication Data
US 2012/0049139 A1    Mar. 1, 2012

(30) Foreign Application Priority Data

May 12, 2009 (JP) .................... 2009-115474
Apr. 2, 2010 (JP) .................... 2010-086409

(51) Int. Cl.
C09K 9/00 (2006.01)
G02F 1/00 (2006.01)
B41M 5/20 (2006.01)
B41M 5/24 (2006.01)

(52) U.S. Cl. .......... 252/583; 106/31.16; 106/31.58; 106/316; 252/582; 252/586; 428/402.2; 428/913; 503/200; 503/201; 503/204; 503/209; 503/213

(58) Field of Classification Search .......... 252/582, 252/583, 586; 106/31.16, 31.58, 316; 428/402.2, 428/913; 503/200, 201, 204, 209, 213
See application file for complete search history.

(56) References Cited

U.S. PATENT DOCUMENTS 5,558,699 A * 9/1996 Nakashima et al. ....... 106/31.16
2004/0229754 A1* 11/2004 Fujita .......................... 503/209

FOREIGN PATENT DOCUMENTS

JP          02-175187     *   7/1990
(Continued)

OTHER PUBLICATIONS

International Search Report issued on Jun. 8, 2010 in the corresponding International Patent Application No. PCT/JP2010/058059.

(Continued)

*Primary Examiner* — Bijan Ahvazi
(74) *Attorney, Agent, or Firm* — Sughrue Mion, PLLC

(57) ABSTRACT

The present invention relates to a thermochromic color-memory composition comprising a solubilized mixture of (I) an electron donating coloring organic compound, (II) an electron accepting compound and (III) an ester compound represented by the following formula (1) as a reaction medium which controls color reactions of the components (I) and (II):

[Chem. 1]

(1)

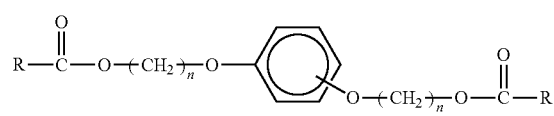

wherein R represents an alkyl group having 1 to 21 carbon atoms or an alkenyl group having 1 to 21 carbon atoms, and n represents an integer of from 1 to 3.

6 Claims, 4 Drawing Sheets

FOREIGN PATENT DOCUMENTS

| | | |
|---|---|---|
| JP | 2-175187 A | 7/1990 |
| JP | 2004-107367 A | 4/2004 |
| JP | 2007-332232 A | 12/2007 |

OTHER PUBLICATIONS

Written Opinion (PCT/ISA/237) issued on Jun. 8, 2010 in the corresponding International Patent Application No. PCT/JP2010/058059.

* cited by examiner

THERMOCHROMIC COLOR-MEMORY COMPOSITION, AND THERMOCHROMIC COLOR-MEMORY MICROCAPSULE PIGMENT HAVING THE COMPOSITION ENCAPSULATED THEREIN

TECHNICAL FIELD

The present invention relates to a thermochromic color-memory composition and a thermochromic color-memory microcapsule pigment containing the same encapsulated therein. More specifically, it relates to a thermochromic color-memory composition which displays reversible discoloration between coloring and decoloring with showing a large hysteresis characteristic upon changing temperature and keeps either of the colored state and decolored state alternately and reversibly even after removal of application of the heat or cold required for the discoloration, and to a thermochromic color-memory microcapsule pigment containing the same encapsulated therein.

BACKGROUND ART

The applicant has already proposed such a type of thermochromic color-memory material (see e.g., Patent Document 1).

Conventional reversible thermal discoloration materials discolor with a discoloration temperature as a border. In the material, only one specified state of both states before and after discoloration exists within a normal temperature range, and the other state is maintained while a heat or cold necessary for expressing the state is applied but returns to the state of normal temperature range when application of the heat or cold is removed. In comparison with such a type, the above-proposed thermochromic color-memory material can selectively maintain, within a normal temperature range, either of the color on the lower temperature side than the discoloration temperature and the color on the higher temperature side than that and can alternately maintain the color by applying a heat or cold as needed. The material is therefore used in various fields such as temperature-sensitive recording materials, toys, ornaments and printing.

CITATION LIST

Patent Literature

Patent Document 1: JP-A-2004-107367

SUMMARY OF INVENTION

Problem that the Invention is to Solve

As is disclosed in the above-described JP-A-2004-107367, such a kind of color-memory effect is produced only in a system where, among compounds selected from esters that control the color reaction, a specified compound is used as a constituting component.

The present invention contemplates further searching for compounds serving as a reaction medium useful for producing the above-described color-memory effect, enhancing freedom degree of selection of the reaction medium, and further promoting the use of such a kind of thermochromic color-memory material.

Means for Solving the Problem

The present inventors have found that a system using, as a reaction medium for color reaction, a compound having a specific structure shows a thermal discoloration characteristic with a large hysteresis width ($\Delta H$) and produces an effective color-memory effect. Thus, they have completed the present invention.

The present invention provides a thermochromic color-memory composition containing a solubilized mixture of (I) an electron donating coloring organic compound, (II) an electron accepting compound and (III) an ester compound represented by the following formula (1) as a reaction medium which controls color reactions of the components (I) and (II):

[Chem. 1]

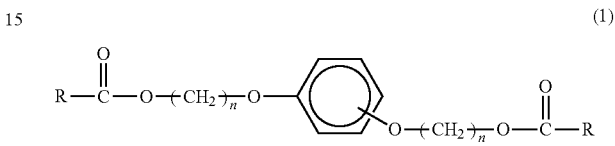

(1)

In the formula, R represents an alkyl group having 1 to 21 carbon atoms or an alkenyl group having 1 to 21 carbon atoms, and n represents an integer of from 1 to 3.

Further, the present invention provides a thermochromic color-memory microcapsule pigment containing the above thermochromic color-memory composition encapsulated therein. The thermochromic color-memory microcapsule pigment preferably discolors with showing a hysteresis width of from 8° C. to 80° C. regarding a color density-temperature curve.

Furthermore, the present invention provides: a thermochromic color-memory liquid composition containing the thermochromic color-memory microcapsule pigment and a vehicle; a thermochromic color-memory resin composition for molding, containing the thermochromic color-memory microcapsule pigment and a resin for molding; and a thermochromic color-memory laminate containing a reversible thermochromic layer in which the thermochromic color-memory microcapsule pigment is fixed to a resin in a dispersed state, the layer being provided on a support.

EFFECT OF THE INVENTION

The invention makes it possible to cause reversible discoloration of coloring and decoloring with showing a broad hysteresis width ($\Delta H$) regarding a color density-temperature curve, to alternately memorize and keep both of the color on the lower temperature side than the discoloration temperature and the color on the higher temperature side than that, and to effectively produce a characteristic that either of the colors can be reversibly reproduced, memorized and maintained by applying a heat or cold as needed. Therefore, the present invention can provide: a thermochromic color-memory composition having applicability to various fields such as thermocolor materials, ornaments, toys and training elements; and a thermochromic color-memory microcapsule pigment containing the composition encapsulated therein.

MODE FOR CARRYING OUT THE INVENTION

A hysteresis characteristic in a color density-temperature curve of the thermochromic color-memory composition and thermochromic color-memory microcapsule pigment using the same according to the present invention will be described below based on the graph of FIG. 1.

Figure 1:
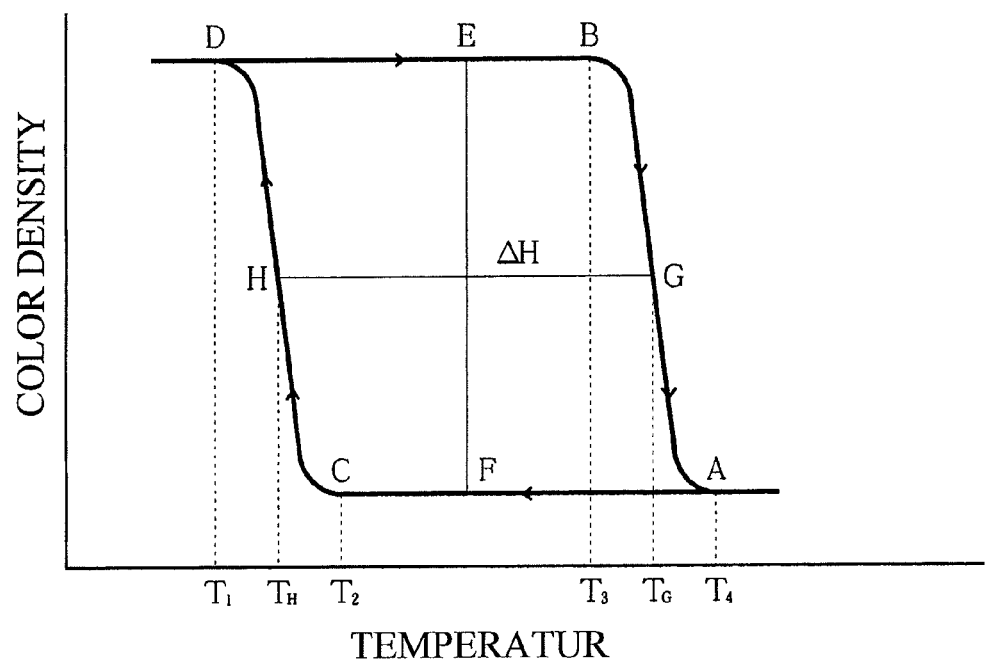
FIG. 1 is a graph for explaining a hysteresis characteristic of the thermochromic color-memory composition of the present invention in a color density-temperature curve.

In FIG. 1, the color density is plotted on the ordinate and the temperature on the abscissa. A change in the color density due to a temperature change progresses along the arrow. Here, A is a point showing the density at a temperature $T_4$ at which a completely decolored state is achieved (hereinafter referred to as "complete decoloring temperature"); B is a point showing the density at a temperature $T_3$ at which a completely colored state can be maintained (hereinafter referred to as "decoloring starting temperature"); C is a point showing the density at a temperature $T_2$ at which a completely decolored state can be maintained (hereinafter referred to as "coloring starting temperature"); and D is a point showing the density at a temperature $T_1$ at which a completely colored state is achieved (hereinafter referred to as "complete coloring temperature").

The discoloration temperature region is a temperature region between $T_1$ and $T_4$, while the temperature region between $T_2$ and $T_3$ is a substantial discoloration temperature region, that is the temperature region in which either of colored state or decolored state can be maintained.

The length of the line segment EF is a measure showing contrast of discoloration, and the length of the line segment HG is a temperature width showing the degree of hysteresis (hereinafter referred to as "hysteresis width ΔH"). The larger ΔH value facilitates keeping of each state before and after discoloration.

The ΔH value, in which each state before and after discoloration can be maintained, falls within a range of from 8° C. to 80° C. Here, Δt, which is a difference between $T_4$ and $T_3$ or a difference between $T_2$ and $T_1$, is a measure for showing sensibility of the discoloration, and a practicable range thereof is from 1° C. to 20° C., preferably 1° C. to 15° C., and more preferably from 1° C. to 10° C.

In addition, in order to allow only one specified state of both states before and after discoloration to exist in a normal temperature range, the complete decoloring temperature ($T_4$) is 40° C. or higher, preferably 50° C. or higher, more preferably 60° C. or higher, and the coloring starting temperature ($T_2$) is 0° C. or lower, preferably −5° C. or lower, more preferably −10° C. or lower.

Although the ratio of the three constituting components (I), (II) and (III) in the present invention depends on the concentration, discoloration temperature, discoloration mode and kind of each component, the component ratio at which desired characteristics are generally obtained is component (II) within the range of from 0.1 to 50 parts, preferably from 0.5 to 20 parts, and component (III) within the range of from 1 to 800 parts, preferably from 5 to 200 parts, based on component (I) 1 part (each of the above-described ratios is part(s) by mass).

Each component may be a mixture of two or more species, and an antioxidant, an ultraviolet absorbent, an infrared absorbent, a solubilizing aid and the like can be added thereto within a range not damaging its function.

Compounds of the components (I), (II) and (III) will be exemplified below specifically.

As the component (I) of the present invention, namely an electron donating coloring organic compound, there may be mentioned diphenylmethane phthalides, phenylindolyl phthalides, indolyl phthalides, diphenylmethane azaphthalides, phenylindolyl azaphthalides, fluorans, styrylquinolines, and diazarhodamine lactones.

Examples of these compounds are shown below.

Examples include: 3,3-bis(p-dimethylaminophenyl)-6-dimethylaminophthalide;
3-(4-diethylaminophenyl)-3-(1-ethyl-2-methylindol-3-yl)phthalide;
3,3-bis(1-n-butyl-2-methylindol-3-yl)phthalide;
3,3-bis(2-ethoxy-4-diethylaminophenyl)-4-azaphthalide;
3-(2-ethoxy-4-diethylaminophenyl)-3-(1-ethyl-2-methylindol-3-yl)-4-azaphthalide;
3-[2-ethoxy-4-(N-ethylanilino)phenyl]-3-(1-ethyl-2-methylindol-3-yl)-4-azaphthalide;
3,6-diphenylaminofluoran;
3,6-dimethoxyfluoran;
3,6-di-n-butoxyfluoran;
2-methyl-6-(N-ethyl-N-p-tolylamino)fluoran;
3-chloro-6-cyclohexylaminofluoran;
2-methyl-6-cyclohexylaminofluoran;
2-(2-chloroanilino)-6-di-n-butylaminofluoran;
2-(3-trifluoromethylanilino)-6-diethylaminofluoran;
2-(N-methylanilino)-6-(N-ethyl-N-p-tolylamino)fluoran;
1,3-dimethyl-6-diethylaminofluoran;
2-chloro-3-methyl-6-diethylaminofluoran;
2-anilino-3-methyl-6-diethylaminofluoran;
2-anilino-3-methyl-6-di-n-butylaminofluoran;
2-xylidino-3-methyl-6-diethylaminofluoran;
1,2-benz-6-diethylaminofluoran;
1,2-benz-6-(N-ethyl-N-isobutylamino)fluoran;
1,2-benz-6-(N-ethyl-N-isoamylamino)fluoran;
2-(3-methoxy-4-dodecoxystyryl)quinoline;
spiro[5H-(1)benzopyrano(2,3-d)pyrimidine-5,1'(3'H)isobenzofuran]-3'-one;
2-(diethylamino)-8-(diethylamino)-4-methyl-spiro[5H-(1)benzopyrano(2,3-g)pyrimidine-5,1'(3'H)isobenzofuran]-3-one;
2-(di-n-butylamino)-8-(di-n-butylamino)-4-methyl-spiro[5H-(1)benzopyrano(2,3-g)pyrimidine-5,1'(3'H)isobenzofuran]-3-one;
2-(di-n-butylamino)-8-(diethylamino)-4-methyl-spiro[5H-(1)benzopyrano(2,3-g)pyrimidine-5,1'(3'H)isobenzofuran]-3-one;
2-(di-n-butylamino)-8-(N-ethyl-N-1-amylamino)-4-methyl-spiro[5H-(1)benzopyrano(2,3-g)pyrimidine-5,1'(3'H)isobenzofuran]-3-one;
3-(2-methoxy-4-dimethylaminophenyl)-3-(1-butyl-2-methylindol-3-yl)-4,5,6,7-tetrachlorophthalide;
3-(2-ethoxy-4-diethylaminophenyl)-3-(1-ethyl-2-methylindol-3-yl)-4,5,6,7-tetrachlorophthalide;
3-(2-ethoxy-4-diethylaminophenyl)-3-(1-pentyl-2-methylindol-3-yl)-4,5,6,7-tetrachlorophthalide;
3',6'-bis[phenyl(2-methylphenyl)amino]-spiro[isobenzofurane-1(3H), 9'-[9H]xanthen]-3-one;
3',6'-bis[phenyl(3-methylphenyamino]-spiro[isobenzofurane-1(3H), 9'-[9H]xanthen]-3-one; and
3',6'-bis[phenyl(3-ethylphenyl)amino]-spiro[isobenzofurane-1(3H), 9'-[9H]xanthen]-3-one.

Additionally, pyridines, quinazolines and bisquinazolines compounds, which are effective for producing fluorescent yellow to red colors, are mentioned.

As the electron accepting compound of the component (II), there may be mentioned a group of compounds having an active proton, a group of pseudo-acidic compounds (a group of compounds which are not acid but acting as acid in the composition to cause color development of the component (I)), a group of compounds having electron voids and the like.

Examples of the compounds having an active proton include monophenols and polyphenols as compounds having a phenolic hydroxyl group, those further having a substituent such as an alkyl group, an aryl group, an acyl group, an alkoxycarbonyl group, a carboxy group and an ester or amide thereof, or a halogen group, and bisphenols, trisphenols, and phenol-aldehyde condensed resins. In addition, the compounds may be metal salts of the above-described compounds having a phenolic hydroxyl group.

The specific examples include:

phenol, o-cresol, tertiary-butylcatechol, nonylphenol, n-octylphenol, n-dodecylphenol, n-stearylphenol, p-chlorophenol, p-bromophenol, o-phenylphenol, n-butyl p-hydroxybenzoate, n-octyl p-hydroxybenzoate, resorcin, dodecyl gallate, 2,2-bis(4-hydroxyphenyl)propane, 4,4-dihydroxydiphenylsulfone, 1,1-bis(4-hydroxyphenyl) ethane, 2,2-bis(4-hydroxy-3-methylphenyl)propane, bis(4-hydroxyphenyl)sulfide, 1-phenyl-1,1-bis(4-hydroxyphenyl) ethane, 1,1-bis(4-hydroxyphenyl)-3-methylbutane, 1,1-bis (4-hydroxyphenyl)-2-methylpropane, 1,1-bis(4-hydroxyphenyl)-n-hexane, 1,1-bis(4-hydroxyphenyl)-n-heptane, 1,1-bis(4-hydroxyphenyl)-n-octane, 1,1-bis(4-hydroxyphenyl)-n-nonane, 1,1-bis(4-hydroxyphenyl)-n-decane, 1,1-bis(4-hydroxyphenyl)-n-dodecane, 2,2-bis(4-hydroxyphenyl)butane, 2,2-bis(4-hydroxyphenyl)ethyl propionate, 2,2-bis(4-hydroxyphenyl)-4-methylpentane, 2,2-bis(4-hydroxyphenyl)hexafluoropropane, 2,2-bis(4-hydroxyphenyl)-n-heptane and 2,2-bis(4-hydroxyphenyl)-n-nonane.

Although the above-described compound having a phenolic hydroxyl group can exhibit most effective thermal discoloration characteristics, a compound selected from aromatic carboxylic acids, aliphatic carboxylic acids having from 2 to 5 carbon atoms, carboxylic acid metal salts, acidic phosphoric acid esters and metal salts thereof, and 1,2,3-triazole and derivatives thereof, and the like may be used.

The ester compound as the component (III) will be described specifically below.

The ester compounds used in the present invention are compounds represented by the formula (1). In the formula, R represents an alkyl group having from 1 to 21 carbon atoms or an alkenyl group having from 1 to 21 carbon atoms, preferably an alkyl group having from 3 to 17 carbon atoms, and more preferably an alkyl group having from 4 to 15 carbon atoms.

In the formula, n represents an integer of from 1 to 3, preferably an integer of 1 or 2, and more preferably 2.

The ester compound represented by the formula (1) is obtained by esterification of bis(hydroxyalkoxy)benzene represented by the following formula (2) with various carboxylic acids.

[Chem. 2]

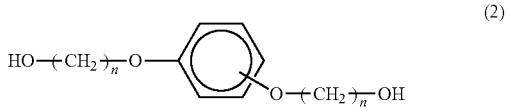

(2)

Specifically, bis(hydroxyalkoxy)benzene represented by formula (2) include 1,4-bis(hydroxymethoxy)benzene, 1,3-bis(hydroxymethoxy)benzene, 1,2-bis(hydroxymethoxy) benzene, 1,4-bis(2-hydroxyethoxy)benzene, 1,3-bis(2-hydroxyethoxy)benzene, 1,2-bis(2-hydroxyethoxy)benzene, 1,4-bis(3-hydroxypropoxy)benzene, 1,3-bis(3-hydroxypropoxy)benzene, and 1,2-bis(3-hydroxypropoxy)benzene.

Also, 1,4-bis(hydroxyalkoxy)benzenes, and 1,3-bis(hydroxyalkoxy)benzenes are suitably used in terms of availability and cost, and 1,4-bis(2-hydroxyethoxy)benzene and 1,3-bis(2-hydroxyethoxy)benzene are more suitably used.

As the carboxylic acids used in the esterification with bis (hydroxyalkoxy)benzenes represented by formula (2), any of known carboxylic acids may be used.

As the carboxylic acids, there may be mentioned acetic acid, propionic acid, butyric acid, valeric acid, capronic acid, enanthic acid, caprylic acid, pelargonic acid, capric acid, undecanoic acid, lauric acid, tridecanoic acid, myristic acid, pentadecanoic acid, palmitic acid, heptadecanoic acid, stearic acid, n-nonadecanoic acid, arachidic acid, n-heneicosanoic acid, behenic acid, isobutyric acid, isovaleric acid, DL-2-methyl butyric acid, pivalic acid, 2-methyl valeric acid, 4-methyl valeric acid, tert-butyl acetic acid, 2-ethyl butyric acid, 2,2-dimethyl butyric acid, 2-ethyl hexanoic acid, 2-n-propyl-n-valeric acid, 3,5,5-trimethylhexanoic acid, 2-hexyldecanoic acid, 2-heptylundecanoic acid, isostearic acid, oleic acid, elaidic acid, linoleic acid, linolenic acid, and erucic acid.

Various ester compounds can be obtained by combining the bis(hydroxyalkoxy)benzenes and the carboxylic acids. And by using them as component (III), thermochromic color-memory compositions having various discoloration temperatures can be obtained.

The following specifically show the ester compounds represented by formula (I).

[Chem. 3]

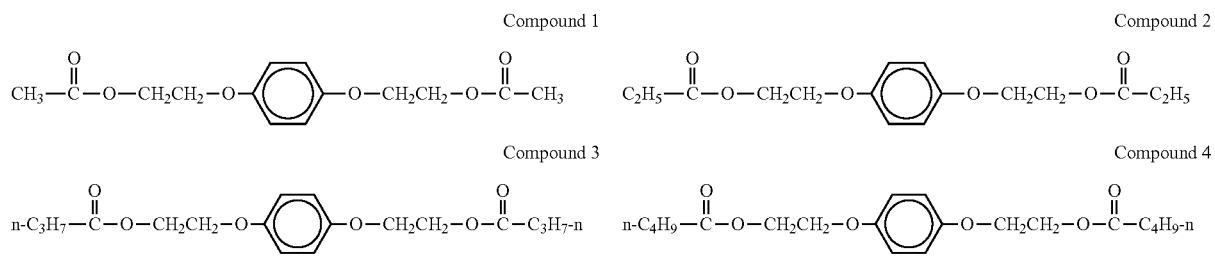

Compound 1

Compound 2

Compound 3

Compound 4

-continued
Compound 5
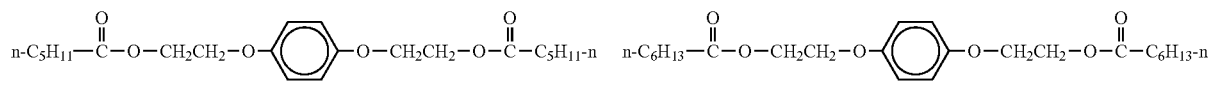
Compound 6
Compound 7
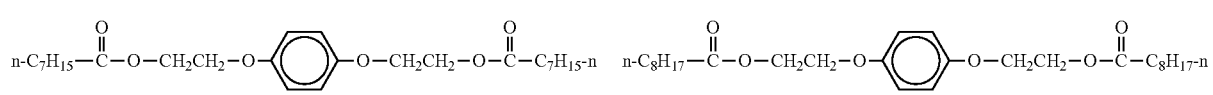
Compound 8
Compound 9
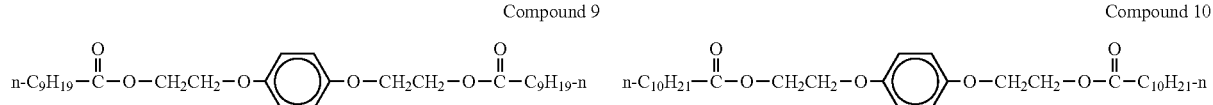
Compound 10
Compound 11
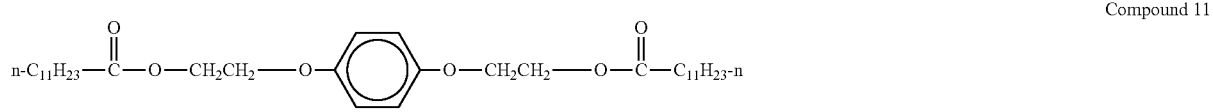
[Chem. 4]
Compound 12
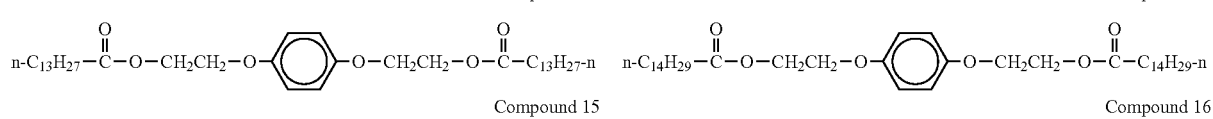
Compound 13
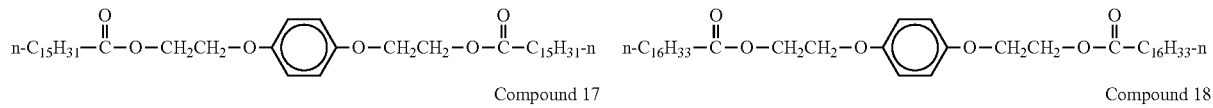
Compound 14
Compound 15
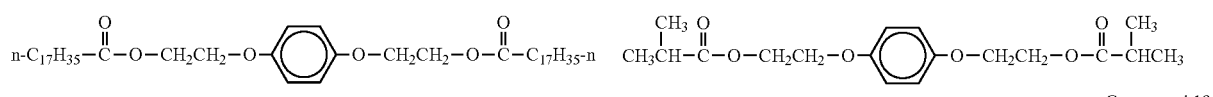
Compound 16
Compound 17
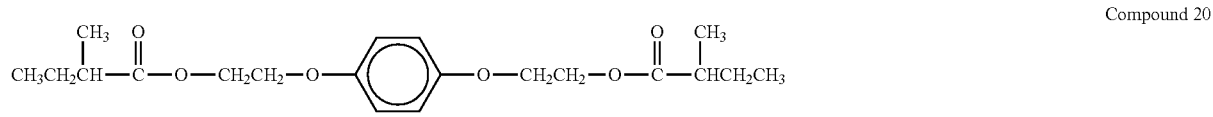
Compound 18
Compound 19
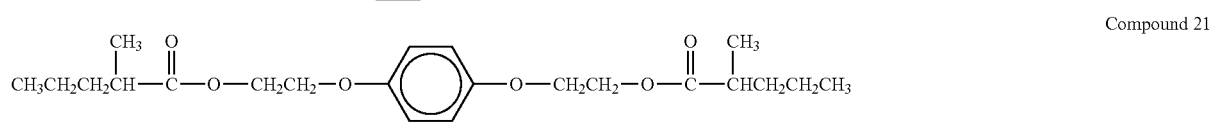
Compound 20
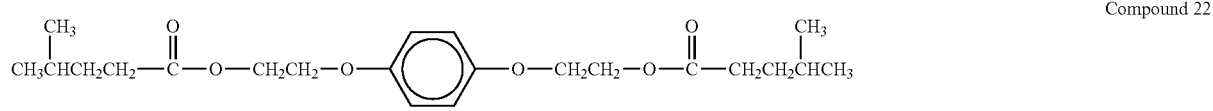
Compound 21
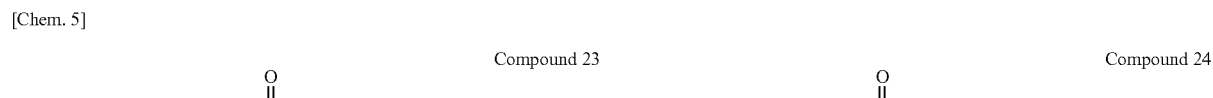
Compound 22
[Chem. 5]
Compound 23
Compound 24
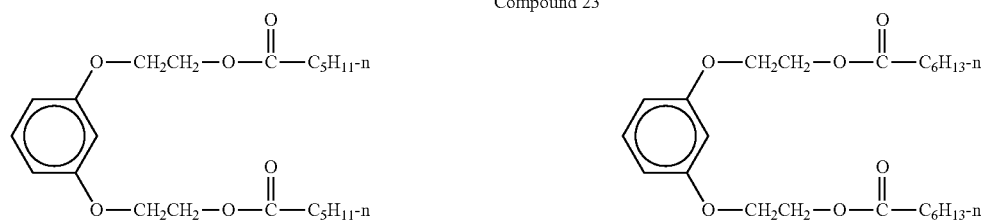

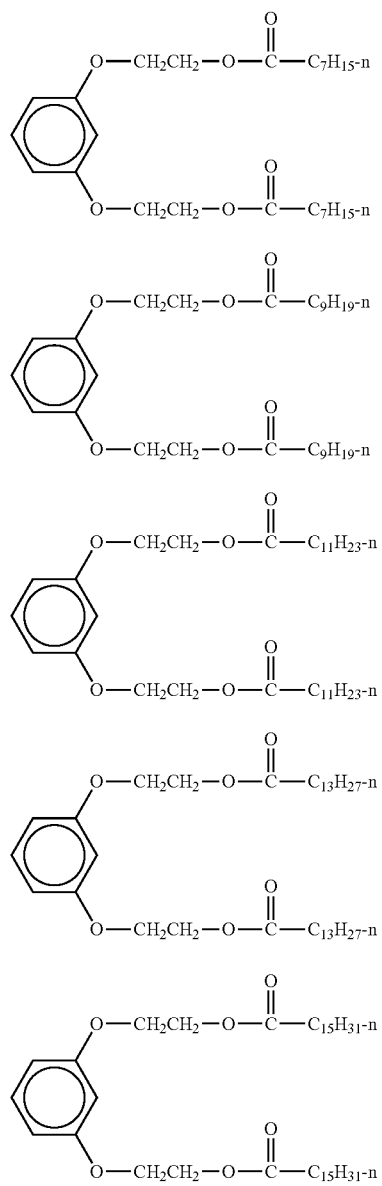
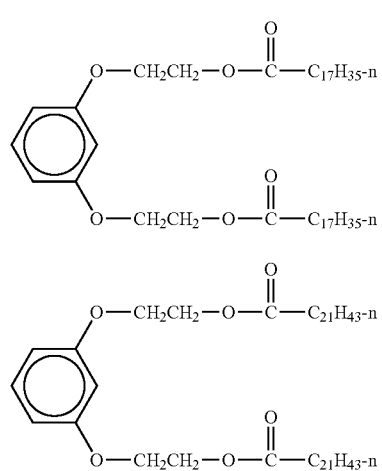
-continued
Compound 25
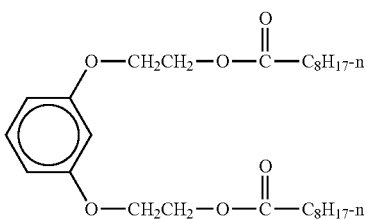
Compound 26
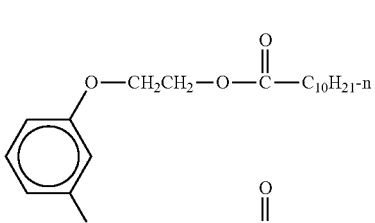
Compound 27
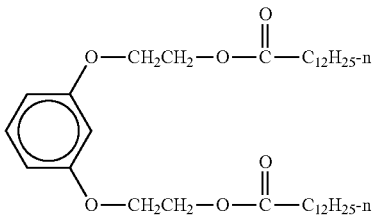
Compound 28
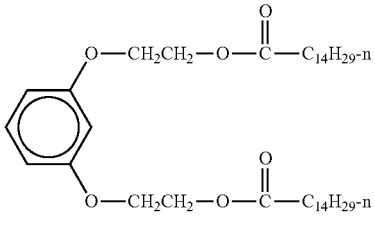
Compound 29
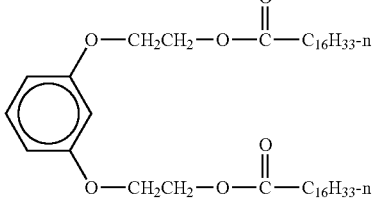
Compound 30
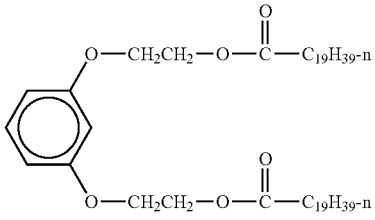
Compound 31
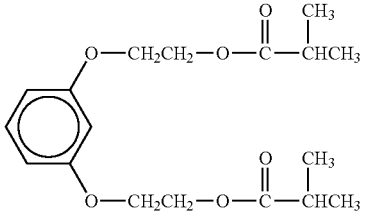

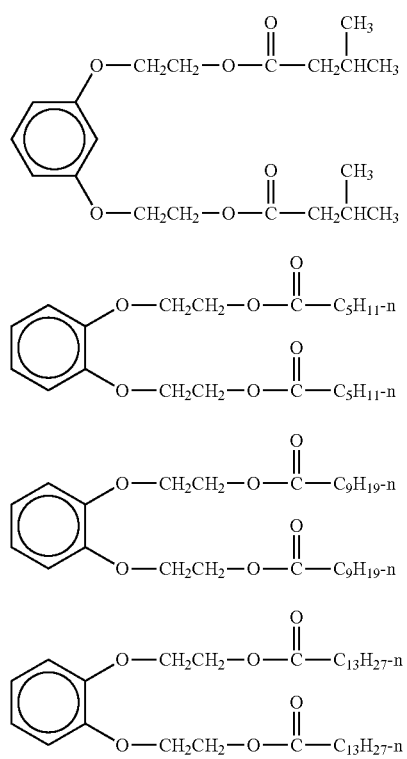
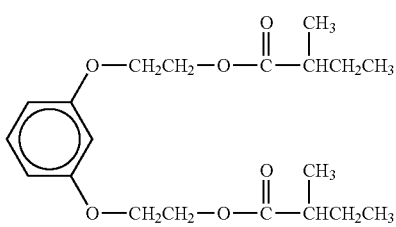
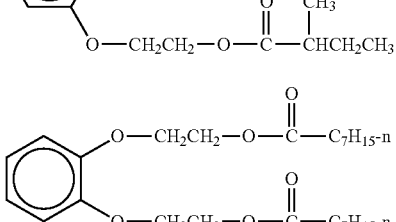
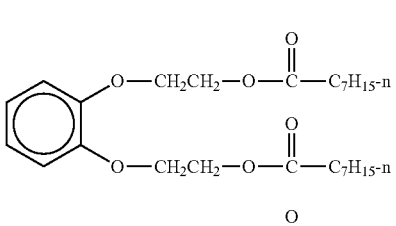
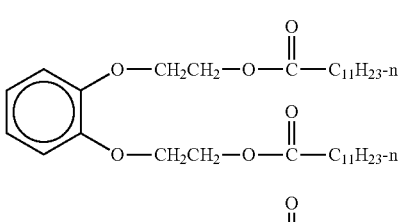
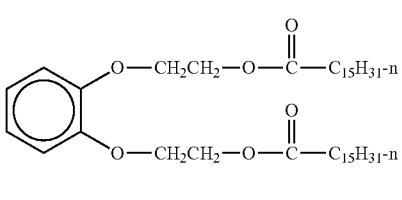
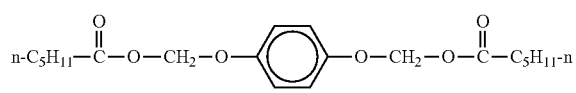
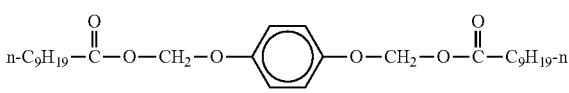
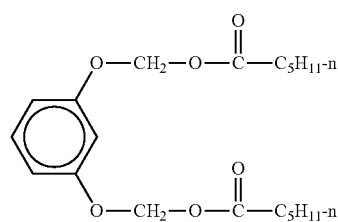
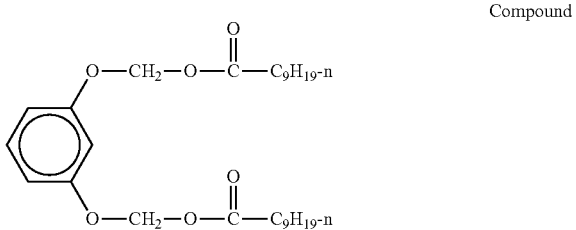
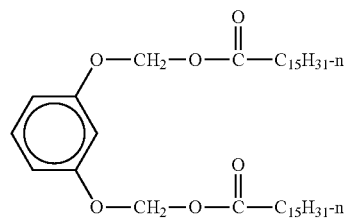
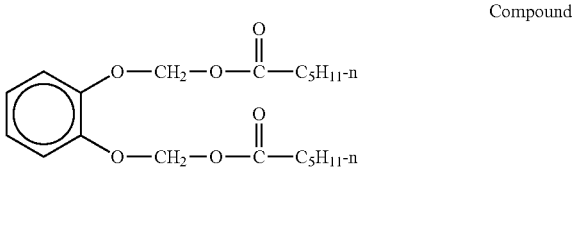
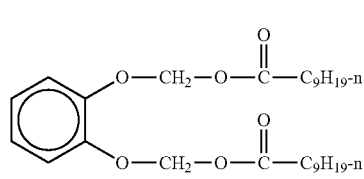

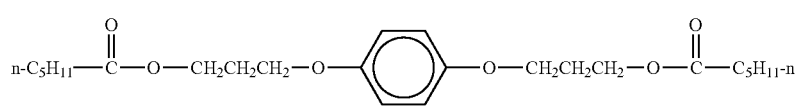

Compound 56

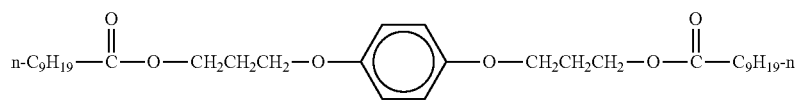

Compound 57

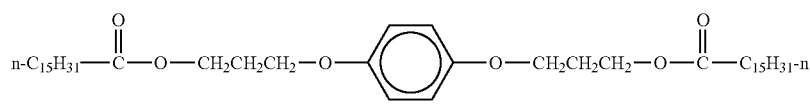

Compound 58

[Chem. 8]

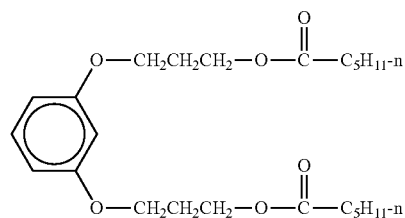

Compound 59

Compound 60

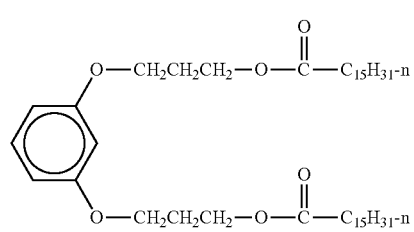

Compound 61

Compound 62

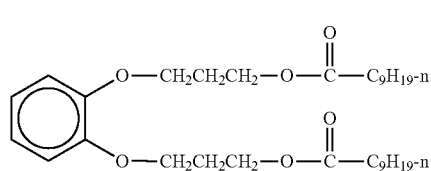

Compound 63

Compound 64

The above-described compound can achieve a wide hysteresis width similar to the case of using an ester compound used in the known thermochromic color-memory composition. Specifically, the hysteresis width ($\Delta H$) is from 8 to 80° C.

The composition having such a hysteresis width is excellent in the function of selectively maintaining either a color on the lower temperature side or a color on the higher temperature side with a discoloration temperature band, and is excellent in applicability for a variety of applications.

Although the above-described ester compound is used as the component (III) of the present invention, esters, alcohols, carboxylic acids, ketones, amides or the like can be added as needed within a range not causing a great change in the hysteresis characteristic. In this case, the additive amount is preferably 20 or less (parts by mass) based on 100 of the ester compound of the present invention, in view of effective exhibition of a desired color-memory effect.

A homogeneous solubilized mixture containing at least the above-described three components can be encapsulated in microcapsules to form a thermochromic color-memory microcapsule pigment. By protecting the mixture with a capsule membrane wall, not only its function does not deteriorate even if it is brought into contact with a chemically active substance such as acidic substance, basic substance or peroxide, or another solvent component, but also the mixture has improved heat stability.

The material of the capsule membrane wall includes epoxy resins, urea resins, urethane resins, and isocyanate resins.

It is possible to provide the microcapsule pigment for practical use after imparting durability thereto by forming a secondary resin film on their surface or modifying their surface properties depending on the purpose.

The above-described microcapsules satisfy the practicality when their average particle diameter is within a range of from 0.1 to 50 µm, preferably from 0.1 to 30 and more preferably from 0.5 to 20 µm.

Incidentally, the particle diameter is measured by using the laser diffraction/scattering particle diameter distribution measuring device (LA-300 manufactured by Horiba, Co., Ltd.), and an average particle diameter (median diameter) is calculated on the basis of the measured value.

In a system where the above-described microcapsule pigment has an average diameter exceeding 50 µm, it lacks in dispersion stability and processing suitability in blending into inks, paints or thermoplastic resins.

On the other hand, in a system where an average diameter is 0.1 µm or less, high density coloring is hardly attained.

Furthermore, by reducing the size of the microcapsule pigment, ΔH of the microcapsule pigment can be widened further as compared with the ΔH of the homogeneous solubilized mixture of the composition of the three necessary components.

The above-described microcapsule pigment is effective when an encapsulated body/wall membrane ratio falls within a range of 7/1 to 1/1 (mass ratio). When the ratio of the wall membrane exceeds the above-described range, deterioration in the color density and vividness is inevitably occurred during color development. It is preferred that the encapsulated body/wall membrane ratio is from 6/1 to 1/1 (mass ratio).

Examples of the microencapsulation method include known isocyanate-type interfacial polymerization, in situ polymerization such as melamine-formalin system, submerged coat hardening, phase separation from aqueous solution, phase separation from organic solvent, melt dispersion cooling, aerial suspension coating, and spray drying. It can be selected as needed, depending on the use purpose.

Also, an ordinarily employed dyestuff or pigment (non-thermochromic one) may be added to the microcapsule pigment to cause discoloration behavior from color (1) to color (2).

The above-described thermochromic color-memory microcapsule pigment can be used, after dispersed in a vehicle containing additives if necessary, as a thermochromic color-memory liquid composition for printing ink to be used in screen printing, offset printing, process printing, gravure printing, coater or pad printing; a paint to be used in brush coating, spray coating, electrostatic coating, electro-deposition coating, flow coating, roller coating or dip coating; an ink for ink jet use; a UV curable ink; an ink for use in writing implements or coating implements such as marking pen, ball-point pen, fountain pen and writing brush pen; colors; cosmetics; or coloring liquid for fibers.

Examples of the additives include resins, crosslinking agents, curing agents, desiccants, plasticizers, viscosity regulators, dispersing agents, ultraviolet absorbents, antioxidants, light stabilizers, anti-settling agents, lubricants, gelling agents, antifoaming agents, flatting agents, penetrating agents, pH regulators, foaming agents, coupling agents, humectants, fungicides, antiseptics and anticorrosive agents.

Among them, as the vehicle for writing implement used in ink for writing implement, there may be mentioned an oily vehicle including an organic solvent, or an aqueous vehicle including water and if necessary an organic solvent.

As the organic solvent, there may be mentioned ethanol, propanol, butanol, glycerine, sorbitol, triethanolamine, diethanolamine, monoethanolamine, ethylene glycol, diethylene glycol, thiodiethylene glycol, polyethylene glycol, propylene glycol, butylene glycol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, ethylene glycol monomethyl ether acetate, sulfolane, 2-pyrrolidone, N-methyl-2-pyrrolidone or the like.

As the ink for writing implement, there may be mentioned a shear thinning ink containing a shear thinning agent in the vehicle; and a cohesive ink containing an aqueous polymeric cohesive agent in the vehicle to suspending the pigment in a loosey condensed state.

By adding the shear thinning agent, it is possible not only to suppress cohesion and sedimentation of the pigment, but also to suppress spreading of the handwriting, so that a good handwriting can be formed.

Furthermore, in the case where the writing implement filled with the ink is a ball-point pen, it is possible to prevent a leakage of the ink from an interval between a ball and a tip when not being used, or to prevent a reverse flowing of the ink when a writing front-end is disposed upward (erect state).

Examples of the shear thinning agent include xanthan gum, welan gum, succinoglycan (average molecular weight is about 100 to 8,000,000) that is an organic acid modified heteropolysaccharide of which constituent monosaccharides are glucose and galactose, guar gum, locust bean gum and a derivative thereof, hydroxyethylcellulose, alkyl alginate esters, a polymer containing alkyl esters of methacrylate as a main component and having a molecular weight of 100,000 to 150,000, glucomannan, thickening polysaccharides having a gelation ability extracted from seaweeds such as agar or carrageenin, benzyliden sorbitol and benzyliden xylitol or a derivative thereof, a crosslinking acrylic acid polymer, an inorganic fine particulate, polyglycerine fatty acid ester, polyoxyethylene sorbitan fatty acid ester, polyethylene glycol fatty acid ester, polyoxyethylene alkyl ether, polyoxypropylene alkyl ether, polyoxyethylene alkyl phenyl ether, a non-ionic surfactant such as fatty acid amide having a HLB value of 8 to 12, salts of dialkyl or dialkenyl sulfosuccinate, a mixture of N-alkyl-2-pyrrolidone and an anionic surfactant, and a mixture of polyvinylalcohol and an acrylic resin.

As the additive amount of the shear thinning agent, it is added in a range of 0.1 to 20% by mass, and preferably 0.1 to 10% by mass in the ink.

As the aqueous polymeric cohesive agent, there may be mentioned polyvinyl pyrrolidone, polyethylene oxide, or aqueous polysaccharide.

As the aqueous polysaccharide, there may be mentioned tragacanth gum, guar gum, pullulan, cyclodextrin and aqueous cellulose derivative. Specific examples of the aqueous cellulose derivative include methylcellulose, hydroxyethyl cellulose, hydroxypropyl cellulose, hydroxyethylmethyl cellulose, and hydroxypropylmethyl cellulose.

As the additive amount of the aqueous polymeric cohesive agent, it is added in a range of 0.05 to 20% by mass, and preferably 0.05 to 10% by mass in the ink.

By using a comb type polymeric dispersant having carboxyl groups on its side chains and an organic nitrogen sulfur compound in conjunction with the polymeric cohesive agent, dispersibility of the loose aggregate of the microcapsule pigment due to the polymeric cohesive agent can be improved.

Although the comb type polymeric dispersant having carboxyl groups on its side chains is not particularly limited as long as the comb type polymeric compound has a plurality of carboxyl groups on its side chains, an acryl polymer compound having a plurality of carboxyl groups on its side chains is preferable, and may be exemplified by trade name: Solsperse 43000 manufactured by Lubrizol, Co., Ltd. in Japan as the above compound.

The organic nitrogen sulfur compound further suppresses sedimentation of the microcapsule pigment by vibration when the ink composition is filled in a writing implement for practical use.

This further improves dispersibility that the loose aggregates of the microcapsule pigment are dispersed by the comb type polymeric dispersant having carboxyl groups on its side chains.

As the organic nitrogen sulfur compound, a compound selected from thiazole-based compounds, isothiazole-based compounds, benzothiazole-based compounds, and benzoisothiazole-based compounds, is used.

As specific examples of the organic nitrogen sulfur compound, one or two or more compounds selected from 2-(4- thiazoyl)benzimidazole (TBZ), 2-(thiocyanatemethylthio)-1,3-benzothiazol (TCMTB), 2-methyl-4-isothiazolin-3-one, 5-chloro-2-methyl-4-isothiazolin-3-one are used, and preferably, one or two or more compounds selected from 2-(4-thiazoyl)benzimidazole (TBZ), 2-methyl-4-isothiazolin-3-one, and 5-chloro-2-methyl-4-isothiazolin-3-one are used.

The organic nitrogen sulfur compound may be exemplified by trade name: Topside 88, Topside 133, Topside 170, Topside 220, Topside 288, Topside 300, Topside 400, Topside 500, Topside 600, Topside 700Z, Topside 800, and Topside 950, manufactured by Permachem Asia Ltd.; and trade name: Hokustar HP, Hokustar E50A, Hokuside P200, Hokuside 6500, Hokuside 7400, Hokuside MC, Hokuside 369, and Hokuside R-150 manufactured by Hokko Sangyo, Co., Ltd.

The mass ratio of the comb type polymeric dispersant having carboxyl groups on its side chains and the organic nitrogen sulfur compound is 1:1 to 1:10, and preferably 1:1 to 1:5. By satisfying the above range, it is possible to sufficiently develop dispersibility of the loose aggregates of the microcapsule pigment and suppression of the sedimentation of the microcapsule pigment by vibration.

Furthermore, in the case where an aqueous resin, which is applied in order to impart a fixing property to the paper surface of the handwriting or viscosity, is added to the ink, the ink including the comb type polymer dispersant having carboxyl groups on its side chains and the organic nitrogen sulfur compound has a further improved function to increase the stability of the microcapsule pigment.

The aqueous resin includes alkyd resin, acryl resin, styrene-maleic acid copolymer, cellulose derivative, polyvinyl pyrrolidone, polyvinyl alcohol, and dextrin. Preferably, polyvinyl alcohol is used.

Further, as polyvinyl alcohol, a partial saponification type polyvinyl alcohol having a degree of saponification of 70 to 89 mole % is more preferably used because the ink has good solubility in an acidic range.

As the additive amount of the aqueous resin, it is added in a range of 0.3 to 3.0% by mass, and preferably 0.5 to 1.5% by mass in the ink.

Moreover, in the case where the ink is used with being filled in a ball-point pen, it is preferable that the abrasion of a ball receiving sheet is prevented by adding lubricants including higher fatty acids such as oleic acid, non-ionic surfactants having a long chain alkyl group, polyether modified silicone oil, thiophosphorous acid triesters such as thiophosphorous acid tri(alkoxycarbonyl methyl ester) or thiophosphorous acid tri(alkoxycarbonyl ethyl ester), phosphoric acid monoester of polyoxyethylene alkyl ether or polyoxyethylene alkylaryl ether, phosphoric acid diester of polyoxyethylene alkyl ether or polyoxyethylene alkylaryl ether, and metal salts, ammonium salts, amine salts, and alkanolamine salts thereof.

Furthermore, in the case of adding 2,5-dimercapto-1,3,4-thiadiazole and/or a salt thereof to the ink, it is possible to suppress dispersion defects or aggregation of the microcapsule pigment occurring after a frozen ink thawed again even when the pH of the ink is in an acidic or alkaline region, to prevent an increase of viscosity of the ink or the accompanying disconnection of the handwriting or color lightening, and further to prevent corrosion of a ball when the ink is used in a ball-point pen.

As the additive amount of 2,5-Dimercapto-1,3,4-thiadiazole and/or the salt thereof, it is added in a range of 0.01 to 10% by mass, and preferably 0.05 to 7% by mass in the ink.

In addition, if necessary, resins such as acryl resins, a styrene-maleic acid copolymer, a cellulose derivative, polyvinyl pyrrolidone, polyvinyl alcohol, and dextrin may be added to impart a fixing property to the surface of the paper or viscosity. In addition, there can be added inorganic salts such as sodium carbonate, sodium phosphate, and sodium acetate; pH controlling agents such as an organic basic compound such as an aqueous amine compound; an anticorrosive agents such as benzotriazole, tolyltriazole, dicyclohexylammonium nitrite, diisopropylammonium nitrite, and saponin; antiseptics or fungicides such as phenol, a sodium salt of 1,2-benzthiazoline 3-one, sodium benzoate, sodium dihydroacetate, potassium sorbate, paraoxypropylbenzoate, and 2,3,5,6-tetrachloro-4-(methylsulfonyl)pyrridin; wetting agents such as urea, non-ionic surfactants, a reduced or non-reduced starch hydrolysate, oligosaccharides such as trehalose, sucrose, cyclodextrin, glucose, dextrin, sorbitol, mannitol, and sodium pyrophosphate; antifoaming agents; dispersants; and fluorine-based surfactants or non-ionic surfactants for improving permeability of inks.

A ball-point pen and marking pen that receives the ink will be described.

In the case where the ink is filled in a ball-point pen, the structure and shape of the ball-point pen are not particularly limited. Examples thereof includes a ball-point pen having an ink receiving tube in which a shear thinning ink is filled in an axle body, in which the ink receiving tube is connected with a ball-point pen tip where a ball is mounted on its front-end, and a liquid plug for preventing backflow is closely contacted in the edge of the ink.

The ball-point pen tip will be explained in more detail. there can be applied a tip formed by holding a ball in a ball holding part in which the vicinity of a front-end of a metal pipe is pressed and deformed inwardly from the outside; a tip formed by holding a ball in a ball holding part formed by cutting a metal material by a drill and the like; a tip in which a ball receiving sheet made of a resin is provided in the tip made of metal or plastic; or a tip in which a ball held in the tip is pressed in a front direction by a spring.

The ball made of cemented carbide, stainless steel, ruby, ceramic, resin, rubber, and the like, and having a diameter of about 0.3 to 2.0 mm, preferably 0.3 to 1.5 mm, and more preferably 0.3 to 1.0 mm can be applicable.

As the ink receiving tube receiving ink, for example, a molded body formed of a thermoplastic resin such as polyethylene, polypropylene, polyethylene terephthalate, and nylon may be used.

In addition to the direct connection of the tip to the ink receiving tube, the ink receiving tube and the tip may be connected through a connection member.

Incidentally, the ink receiving tube may be a refill type in which the refill is provided into an axle body made of a resin or metal, or the ink may be directly filled in an axle body in which the axle body mounting a tip in the front-end is used itself as an ink receiving body.

Moreover, in the case where the ink composition is received in an in-and-out type ball-point pen, the structure and shape of the in-and-out type ball-point pen are not particularly limited, but any structure can be adopted so long as the writing front-end provided in the ball-point pen refill is received in the axle body while being exposed to the atmosphere and the writing front-end is protruded from the opening part of the axle body by actuation of the in-and-out type mechanism.

A method for operating the in-and-out type mechanism may be, for example, a knock type, a rotation type, or a slide type.

The knock type can be exemplified by a configuration in which a knock part is provided on a rear end of the axle body or a lateral surface of the axle body, and the ball-point pen tip is ejected from and put in through the fore-ended opening part of the axle body by pressing the knock part, or a configuration in which the ball-point pen tip is ejected from and put in through the fore-ended opening part of the axle body by pressing a clip part provided on the axle body.

The rotation type can be exemplified by a configuration in which a rotation part is provided on a rear part of the axle body and the ball-point pen tip is ejected from and put in through the fore-ended opening part of the axle body by rotating the rotation part.

The slide type can be exemplified by a configuration in which a slide part is provided on a lateral surface of the axle body and the ball-point pen tip is ejected from and put in through the fore-ended opening part of the axle body by operating the slide part, or a configuration in which the ball-point pen tip is ejected from and put in through the fore-ended opening part of the axle body by sliding a clip part provided on the axle body.

The in-and-out type ball-point pen may be a complex type in-and-out type ball-point pen in which a plurality of ball-point pen refills are contained in the axle body, and the writing front-end of any one of the ball-point pen refills ejected from and put in through the fore-ended opening part of the axle body by operating the in-and-out type mechanism.

An ink follower is filled in a rear end of ink received in the ink receiving tube.

The composition of the ink follower includes a non-volatile liquid or a hardly volatile liquid.

Specific examples include vaseline, spindle oil, castor oil, olive oil, mineral oil refineries, liquid paraffine, polybutene, $\alpha$-olefine, oligomer or cooligomer of $\alpha$-olefine, dimethyl silicone oil, methylphenyl silicone oil, amino modified silicone oil, polyether modified silicone oil, and fatty acid modified silicone oil. It can be used alone or in combination with two or more thereof.

It is preferable that the viscosity of the non-volatile liquid and/or the hardly volatile liquid is increased to a suitable viscosity by adding a thickening agent. There may be mentioned, as the thickening agent, silica having hydrophobic treated surface; particulate silica having a methylated surface; aluminum silicate; swellable mica; a clay-based thickening agent such as hydrophobically treated bentonite or montmorilonite; fatty acid metal soaps such as magnesium stearate, calcium stearate, aluminum stearate, and zinc stearate; a dextrin-based compound such as tribenzylidene sorbitol, fatty acid amide, amide modified polyethylene wax, hydrogenated castor oil, or fatty acid dextrin; and a cellulose-based compound.

The liquid ink follower may be used in combination with a solid ink follower.

In the case where the ink is filled in a marking pen, the structure and shape of the marking pen are not particularly limited. For example, the marking pen can be exemplified by a marking pen in which an ink occlusion body containing fiber bundle is embedded in an axle body, a marking pen tip containing a processed fiber having a capillary gap therein is mounted directly or via a connection member on the axle body, and a cohesive ink is impregnated in the ink occlusion body of the marking pen formed by connecting the ink occlusion body and the tip, or a marking pen in which the tip and the ink receiving tube are disposed through a valve body that opens by pressing the tip and the ink is directly received in an ink receiving tube.

The tip is a generally known porous member having communication pores of which porosity is selected within the range of about 30 to 70%, made of processed resin of fibers, fusion processed bodies of hot-melt fiber, and a felt, and the tip is provided for practical use by processed its one end in a cannonball form, a rectangular form, or a chisel form depending on the purpose.

The ink occlusion body is configured by bundling crimped fibers in a length direction, incorporating the fibers into a covering material such as a plastic tub or a film, and adjusting its porosity within a range of about 40 to 90%.

The valve body may be a generally known pumping type, and also it is preferred to adjust to a spring pressure which the valve can be opened by pen pressure.

The shape of the ball-point pen or marking pen is not limited thereto, but may be a both head type writing implement in which tips of different type are provided or pen ends for introducing inks of different colors are provided.

The handwriting obtained by writing on a subject paper using a writing implement receiving the ink composition for writing implement can be discolored by heating or cooling.

As heating means, a drier or a finger rubbing method can be used, but it is preferable that discoloration is implemented by friction using a frictional member or a frictional body as a means discolorable by a simple method.

As the frictional member or the frictional body, an elastic body such as an elastomer or a plastic foamed body, which has a good elasticity and can generate frictional heat by an appropriate friction is preferable. However, a plastic molded body, stone, wood, metal and cloth may be used as well.

As a material of the frictional member or the frictional body, a silicone resin, a SBS resin (styrene-butadiene-styrene copolymer), a SEBS resin (styrene-ethylene-butylene-styrene block copolymer), or a polyester-based resin is suitably used.

A set of writing implement containing the frictional member may be obtained by combining a writing implement and a member (frictional body) having any suitable shape, but portability is improved when fixing the frictional body to the writing implement.

In the case of the writing implement having a cap, a point at which the frictional member is installed is not particularly limited, but, for example, the cap itself may be formed by a frictional member, the shaft body itself may be formed by a frictional member, and when a clip is installed, the clip itself may be formed by a frictional member. Also, the frictional member may be installed on a front end (top part) of the cap, or a rear end of the axle body (portion in which a writing front end is not installed).

In the case of an in-and-out type writing implement, a point at which the frictional member is installed is not particularly limited, but, for example, the axle body itself may be formed by a frictional member and when a clip is installed, the clip itself may be formed by a frictional member, or the frictional member may be installed around an opening part of the axle body, in a rear end of the axle body (portion in which a writing front end is not provided), or in a knock part.

As a cooling means, a cold heat discoloration device using a peltier device, a cold heat discoloration device in which a refrigerant such as cold water or ice pieces is filled, a refrigerator, and a freezer may be applied.

Using the above-described liquid composition, a reversible thermochromic layer is provided on a support of any of various material and shapes, whereby a thermochromic color-memory laminate (printed matter) is formed.

The above-described reversible thermochromic layer is a layer formed by evaporation of the solvent in the liquid composition and composed of the other components (additives), and the above-described microcapsule pigment is fixed to a resin in a dispersed state.

The material of the support on which the above-described thermochromic color-memory liquid composition is applied or printed is not limited and every material is effective, and its examples include paper, synthetic paper, fiber, fabric, synthetic leather, leather, plastics, glass, pottery materials, metals, wood and stone, which may be not only in a flat shape but also in an irregular form.

In the case where a non-thermochromic coloring layer (including an image) has been formed in advance on the above-described support, the coloring layer can be visualized and invisualized by temperature change by installing the reversible thermochromic layer on the coloring layer, so that the changing mode can be further varied.

In addition to the formation of the reversible thermochromic layer on the support using the above-described liquid composition, it is also possible to form the reversible thermochromic layer on the support using a transfer sheet on which the reversible thermochromic layer is provided in advance.

The above-described thermochromic color-memory microcapsule pigment can each be used as a resin composition for thermochromic color-memory molding by melt-blended with a thermoplastic resin, thermosetting resin, wax or the like to form into the form of pellet, powder or paste. And from the resin composition, three dimensional shaped body having a predetermined shape, moldings such as films, sheets, plates, filaments, rods or pipes, or the like are obtained by a conventional means such as injection molding, extrusion molding, blow molding or cast molding.

A crayon or a toner may be obtained by melt-blending into the thermoplastic resins or waxes.

Also, an ordinarily employed dyestuff or pigment (non-thermochromic one) may be added to the above-described liquid composition or resin composition to cause discoloration behavior from color (1) to color (2).

By laminating a layer containing a light stabilizer and/or transparent metalescent pigment over a laminated product or a molded product formed using the above-described liquid resin composition, light resistance of the product can be improved, or it is possible to improve the durability of the product by laying a topcoat layer thereon.

As the light stabilizer, a UV absorbent, an antioxidant, a singlet oxygen quencher, a superoxide anion quencher, and an ozone quencher can be exemplified.

As the transparent metalescent pigment, a pigment prepared by coating the surface of a core substance such as a natural mica, synthetic mica, glass piece, alumina or a piece of a transparent film with a metal oxide such as titanium oxide can be exemplified.

In an upper layer or a lower layer of the reversible thermochromic layer of the laminate, a porous layer in which a low refractive pigment is fixed to a binder resin in a dispersion state and has different transparencies between in a liquid absorption state and a liquid non-absorption state may be provided.

The porous layer will be described.

The porous layer is a layer in which the low refractive pigment is fixed in conjunction with the binder resin in the dispersion state, and is a layer that has different transparencies between in a dry state and a liquid absorption state.

As the low refractive pigment, there may be mentioned silicate and a salt thereof, barite powder, barium sulfate, barium carbonate, calcium carbonate, gypsum, clay, talc, alumina white, and magnesium carbonate. They have a refractive index in the range of 1.4 to 1.8, and when absorbing water, they show good transparency.

The salt of silicate may be aluminum silicate, potassium aluminum silicate, sodium aluminum silicate, calcium aluminum silicate, potassium silicate, calcium silicate, calcium sodium silicate, sodium silicate, magnesium silicate, and potassium magnesium silicate.

The low refractive pigments may be used in combination of two or more thereof.

The low refractive pigment is dispersed in the vehicle containing a binder resin as a binding agent, and coated on the support, and dried volatile parts thereof to form the porous layer.

As the binder resin, there may be mentioned a urethane resin, a nylon resin, a vinyl acetate resin, an acrylic ester resin, an acrylic ester copolymer resin, an acrylic polyol resin, a vinyl chloride-vinyl acetate copolymer resin, a maleic acid resin, a polyester resin, a styrene resin, a styrene copolymer resin, a polyethylene resin, a polycarbonate resin, an epoxy resin, a styrene-butadiene copolymer resin, an acrylonitrile-butadiene copolymer resin, a methyl methacrylate-butadiene copolymer resin, butadiene resin, a chloroprene resin, a melamine resin, and each resin emulsion, casein, starch, a cellulose derivative, polyvinyl alcohol, a urea resin, and a phenol resin.

Specific examples of the product prepared using the above-described thermochromic color-memory composition or thermochromic color-memory microcapsule pigment containing the composition encapsulated therein, include doll or animal-figured toys; hair for a doll or animal figured toy; doll accessories such as house, furniture, clothing, hat, bag and shoes for a doll; accessory toys; stuffed dolls, painting toys; picture books for toys; puzzle toys such as a jigsaw puzzle; toy bricks; block toys; clay toys; fluid toys; tops; kites; musical instrument toys; cooking toys; gun toys; capturing toys; background toys; toys imitating vehicles, animals, plants, buildings and food articles; clothes such as a T-shirt, a sweat shirt, a blouse, a dress, a bathing suit, a raincoat and a skiwear; footwear such as shoes and shoelaces; personal effects made of cloth such as a handkerchief, a towel and a wrapping cloth; interior ornaments such as a rug, a curtain, a curtain cord, a tablecloth, a carpet, a cushion, a picture frame and an imitation flower; bedding such as bedclothes, a pillow and a mattress; accessories such as a ring, a bracelet, a tiara, earrings, a hair stopper, an attaching nail, a ribbon and a scarf; stationary such as a writing implement, a stamp, an eraser, a celluloid board, a ruler and an adhesive tape; cosmetics such as a lipstick, an eye shadow, a manicure, a hair dye, an attaching nail and a paint for attaching nail; kitchen utensils such as a glass, a plate, chopsticks, a spoon, a fork, a pot and a frying pan; various printed matters such as a calendar, a label, a card, a recording material and those for forgery prevention; books such as a picture book; gloves; a necktie; a hat; a bag; a container for packing use; embroidery thread; sporting goods; fishing goods; a toothbrush; a coaster; a watch; eyeglasses; lighting fixture; an air conditioner; a musical instrument; a pocket body warmer; a cold storage agent; a photo stand; pouches such as a purse; an umbrella; furniture; a vehicle; a construction; a temperature detecting indicator; and training goods.

EXAMPLES

Examples of the present invention will be described below but the present invention should not be construed as being limited to these examples.

The preparation process of a thermochromic color-memory composition and a microcapsule pigment containing the same encapsulated therein, and the measuring method of hysteresis characteristics depending on temperature change of the thermochromic color-memory composition or microcapsule pigment containing the same encapsulated therein, in respective examples, will hereinafter be described.

Incidentally, the term "part(s)" in the following examples means part(s) by mass.

Example 1

Preparation Process of Thermochromic Color-Memory Composition

A thermochromic color-memory composition was obtained by mixing 1 part of 3-(2-ethoxy-4-diethylaminophenyl)-3-(1-ethyl-2-methylindol-3-yl)-4-azaphthalide as the component (I), 2 parts of 2,2-bis(4-hydroxyphenyl)hexafluoropropane as the component (II) and 50 parts of a diester compound (compound 1) of 1,4-bis(2-hydroxyethoxy)benzene and the acetic acid as the component (III), followed by heating to homogeneously dissolve them.

The obtained thermochromic color-memory composition changed color from blue to colorless.

Preparation of Measuring Sample

The obtained thermochromic color-memory composition was charged into a transparent glass capillary having an inner diameter of 1 mm and a length of 78 mm to a height of about 10 mm from the bottom of the capillary, whereby a measuring sample was obtained.

Measurement of Discoloration Temperature

Among the measuring sample, the whole part in which the thermochromic color-memory composition had been charged was immersed in water. While the temperature of water was changed, the discoloring state of the thermochromic color-memory composition was visually observed to measure $T_1$ (complete coloring temperature), $T_2$ (coloring starting temperature), $T_3$ (decoloring starting temperature), and $T_4$ (complete decoloring temperature), and $T_H$ [temperature at a midpoint between $T_1$ and $T_2$; $(T_1+T_2)/2$], $T_G$ [temperature at a midpoint between $T_3$ and $T_4$; $(T_3+T_4)/2$] and $\Delta H$ (hysteresis width; $T_G-T_H$) were determined.

The obtained thermochromic color-memory composition showed hysteresis characteristics of $T_1$: 45° C., $T_2$: 47° C., $T_3$: 80° C., $T_4$: 90° C., $T_H$: 46° C., $T_G$: 85° C., and $\Delta H$: 39° C.

Examples 2 to 18

In the same blending amounts and in the same manner as in Example 1 except that the components (I), (II) and (III) of the thermochromic color-memory composition were changed to the compounds as listed in the following Table, thermochromic color-memory compositions of Examples 2 to 18 were prepared and their hysteresis characteristics were measured as in Example 1.

TABLE 1

| Example | Component (I) | Component (II) | Component (III) |
|---|---|---|---|
| 1 | A | a | Diester of 1,4-bis(2-hydroxyethoxy)benzene and acetic acid (compound 1) |
| 2 | A | a | Diester of 1,4-bis(2-hydroxyethoxy)benzene and propionic acid (compound 2) |
| 3 | A | a | Diester of 1,4-bis(hydroxymethoxy)benzene and butyric acid (compound 3) |
| 4 | A | a | Diester of 1,4-bis(2-hydroxyethoxy)benzene and valeric acid (compound 4) |
| 5 | A | a | Diester of 1,4-bis(hydroxymethoxy)benzene and isovaleric acid (compound 19) |
| 6 | A | a | Diester of 1,4-bis(2-hydroxyethoxy)benzene and caproic acid (compound 5) |

TABLE 1-continued

| Example | Component (I) | Component (II) | Component (III) |
|---|---|---|---|
| 7 | B | a | Diester of 1,4-bis(2-hydroxyethoxy)benzene and caproic acid (compound 5) |
| 8 | C | a | Diester of 1,4-bis(2-hydroxyethoxy)benzene and caproic acid (compound 5) |
| 9 | A | b | Diester of 1,4-bis(2-hydroxyethoxy)benzene and caproic acid (compound 5) |
| 10 | A | a | Diester of 1,4-bis(2-hydroxyethoxy)benzene and capric acid (compound 9) |
| 11 | A | a | Diester of 1,4-bis(2-hydroxyethoxy)benzene and myristic acid (compound 13) |
| 12 | A | a | Diester of 1,3-bis(2-hydroxyethoxy)benzene and capric acid (compound 27) |
| 13 | A | a | Diester of 1,3-bis(2-hydroxyethoxy)benzene and capric acid (compound 27) |
| 14 | B | a | Diester of 1,3-bis(2-hydroxyethoxy)benzene and capric acid (compound 27) |
| 15 | C | a | Diester of 1,3-bis(2-hydroxyethoxy)benzene and capric acid (compound 27) |
| 16 | A | b | Diester of 1,3-bis(2-hydroxyethoxy)benzene and undecanoic acid (compound 28) |
| 17 | A | a | Diester of 1,3-bis(2-hydroxyethoxy)benzene and lauric acid (compound 29) |
| 18 | A | a | Diester of 1,3-bis(2-hydroxyethoxy)benzene and myristic acid (compound 31) |

A of component (I) in the table is 3-(2-ethoxy-4-diethylaminophenyl)-3-(1-ethyl-2-methylindol-3-yl)-4-azaphthalide, B is 1,2-benz-6-(N-ethyl-N-isoamylamino)fluorane, and C is 2-(2-chloroanilino)-6-di-n-butylaminofluorane.

a of component (II) in the table is 2,2-bis(4-hydroxyphenyl)hexafluoropropane and b is 1,1-bis(4-hydroxyphenyl)-2-methylpropane.

Color changes and values of $T_1$, $T_2$, $T_3$, $T_4$, $T_H$, $T_G$ and $\Delta H$ of the thermochromic color-memory compositions of Examples 1 to 18 are shown in the following Table.

TABLE 2

| | Color Change | Discoloration Characteristics (° C.) | | | | | | |
|---|---|---|---|---|---|---|---|---|
| Example | Coloring ↔ Decoloring | $T_1$ | $T_2$ | $T_3$ | $T_4$ | $T_H$ | $T_G$ | $\Delta H$ |
| 1 | Blue ↔ Colorless | 45 | 47 | 80 | 90 | 46 | 85 | 39 |
| 2 | Blue ↔ Colorless | 32 | 34 | 64 | 74 | 33 | 69 | 36 |
| 3 | Blue ↔ Colorless | 33 | 35 | 73 | 83 | 34 | 78 | 44 |
| 4 | Blue ↔ Colorless | 32 | 34 | 62 | 72 | 33 | 67 | 34 |
| 5 | Blue ↔ Colorless | 36 | 38 | 60 | 68 | 37 | 64 | 27 |
| 6 | Blue ↔ Colorless | 33 | 35 | 71 | 81 | 34 | 76 | 42 |
| 7 | Blue ↔ Colorless | 39 | 41 | 69 | 79 | 40 | 74 | 34 |
| 8 | Pink ↔ Colorless | 35 | 37 | 69 | 79 | 36 | 74 | 38 |
| 9 | Black ↔ Colorless | 35 | 37 | 69 | 79 | 36 | 74 | 38 |
| 10 | Blue ↔ Colorless | 57 | 59 | 71 | 81 | 58 | 76 | 18 |
| 11 | Blue ↔ Colorless | 62 | 64 | 79 | 87 | 63 | 83 | 20 |
| 12 | Blue ↔ Colorless | 35 | 37 | 57 | 61 | 36 | 59 | 23 |
| 13 | Blue ↔ Colorless | 37 | 39 | 55 | 59 | 38 | 57 | 19 |
| 14 | Blue ↔ Colorless | 38 | 40 | 55 | 59 | 39 | 57 | 18 |
| 15 | Pink ↔ Colorless | 37 | 39 | 57 | 61 | 38 | 59 | 21 |
| 16 | Black ↔ Colorless | 44 | 46 | 62 | 68 | 45 | 65 | 20 |
| 17 | Blue ↔ Colorless | 44 | 46 | 66 | 70 | 45 | 68 | 23 |
| 18 | Blue ↔ Colorless | 54 | 56 | 73 | 77 | 55 | 75 | 20 |

Example 19

Preparation Process of Thermochromic Color-Memory Microcapsule Pigment

A thermochromic color-memory composition composed of 1 part of 3-(2-ethoxy-4-diethylaminophenyl)-3-(1-ethyl-2-methylindol-3-yl)-4-azaphthalide as component (I), 5 parts of 2,2-bis(4-hydroxyphenyl)hexafluoropropane as component (II) and 50 parts of a diester compound (compound 4) of 1,4-bis(2-hydroxyethoxy)benzene and valeric acid as component (III) was mixed and homogeneously heated to dissolve them. In addition, a solution obtained by further mixing 20 parts of an aromatic polyvalent isocyanate prepolymer as a wall membrane material and 40 parts of ethyl acetate was charged into 100 parts of a 15% aqueous gelatin solution and emulsified and dispersed to form micro-droplets. After the above dispersion was continued stirring at 70° C. for about 1 hour, an aqueous solution of 2 parts of a water-soluble amine compound (trade name: jER cure U, amine adduct of epoxy resin, manufactured by Japan Epoxy Resins Co., Ltd.) dissolved in 23 parts of water was gradually added thereto while stirring. The stirring was continued for about 3 hours with maintaining the liquid temperature at 90° C. to obtain a thermochromic color-memory microcapsule pigment suspension.

By isolating the thermochromic color-memory microcapsule pigment from the above microcapsule pigment suspension by centrifugal separation, a thermochromic color-memory microcapsule pigment changing color from blue to colorless was obtained (average particle diameter: 5 μm).

Preparation of Measuring Sample

A thermochromic color-memory ink was prepared by dispersing 40 parts of the above thermochromic color-memory microcapsule pigment in an aqueous ink vehicle composed of 50.0 parts of an ethylene-vinyl acetate resin emulsion, 1.0 part of a leveling agent, 1.0 part of an antiforming agent, 0.5 parts of a viscosity regulator, and 7.5 parts of water. A measuring sample was obtained by screen-printing a solid pattern on a high-quality paper with the above ink.

Measurement of Discoloration Temperature

The measuring sample was placed in the measurement portion of the colorimeter (TC-3600 type colorimeter, manufactured by Tokyo Denshoku, Co., Ltd.), temperature of the sample portion was increasing or decreasing at the speed of 10° C./min to measure a brightness value as the color density at each temperature, to thereby plot a color density-temperature curve. From the color density-temperature curve, $T_1$, $T_2$, $T_3$ and $T_4$, $T_H$ [temperature at a midpoint between $T_1$ and $T_2$; $(T_1+T_2)/2$], $T_G$ [temperature at a midpoint between $T_3$ and $T_4$; $(T_3+T_4)/2$], and $\Delta H$ (hysteresis width; $T_G$-$T_H$) were obtained.

The obtained thermochromic color-memory microcapsule pigment showed hysteresis characteristics of $T_1$: −14° C., $T_2$: −4° C., $T_3$: 54° C., $T_4$: 74° C., $T_H$: −9° C., $T_G$: 64° C., and $\Delta H$: 73° C.

Examples 20 to 44

In the same manner as in Example 19 except that the components (I), (II) and (III) of the thermochromic color-memory composition encapsulated in microcapsules and blending amounts were changed to the compounds and the blending amounts as listed in the following Table, thermochromic color-memory microcapsule pigments of Examples 20 to 44 were prepared and their hysteresis characteristics were measured as in Example 19.

TABLE 3

| Ex | Component (I) | Blending Amount | Component (II) | Blending Amount | Component (III) Acid | Blending Amount |
|----|---|-----|---|-----|---|-----|
| 19 | A | 1.0 | a | 5.0 | Diester of 1,4-bis(2-hydroxyethoxy)benzene and valeric acid (compound 4) | 50.0 |
| 20 | A | 1.0 | a | 5.0 | Diester of 1,4-bis(2-hydroxyethoxy)benzene and isovaleric acid (compound 19) | 50.0 |
| 21 | A | 1.0 | a | 5.0 | Diester of 1,4-bis(2-hydroxyethoxy)benzene and caproic acid (compound 5) | 50.0 |
| 22 | B | 2.0 | a | 5.0 | Diester of 1,4-bis(2-hydroxyethoxy)benzene and caproic acid (compound 5) | 50.0 |
| 23 | C | 3.0 | a | 5.0 | Diester of 1,4-bis(2-hydroxyethoxy)benzene and caproic acid (compound 5) | 50.0 |
| 24 | A | 1.0 | a<br>c | 3.0<br>3.0 | Diester of 1,4-bis(2-hydroxyethoxy)benzene and caproic acid (compound 5) | 50.0 |
| 25 | A | 1.0 | a | 5.0 | Diester of 1,4-bis(2-hydroxyethoxy)benzene and enanthic acid (compound 6) | 50.0 |
| 26 | A | 1.0 | a | 5.0 | Diester of 1,4-bis(2-hydroxyethoxy)benzene and caprylic acid (compound 7) | 50.0 |
| 27 | A | 1.0 | a | 5.0 | Diester of 1,4-bis(2-hydroxyethoxy)benzene and pelargonic acid (compound 8) | 50.0 |
| 28 | A | 1.0 | a | 5.0 | Diester of 1,4-bis(2-hydroxyethoxy)benzene and capric acid (compound 9) | 50.0 |
| 29 | A | 1.0 | a | 5.0 | Diester of 1,4-bis(2-hydroxyethoxy)benzene and undecanoic acid (compound 10) | 50.0 |
| 30 | A | 1.0 | a | 5.0 | Diester of 1,4-bis(2-hydroxyethoxy)benzene and lauric acid (compound 11) | 50.0 |
| 31 | A | 1.0 | a | 5.0 | Diester of 1,4-bis(2-hydroxyethoxy)benzene and myristic acid (compound 13) | 50.0 |
| 32 | A | 1.0 | a | 5.0 | Diester of 1,3-bis(2-hydroxyethoxy)benzene and caprylic acid (compound 25) | 50.0 |
| 33 | A | 1.0 | a | 5.0 | Diester of 1,3-bis(2-hydroxyethoxy)benzene and pelargonic acid (compound 26) | 50.0 |
| 34 | A | 1.0 | a | 5.0 | Diester of 1,3-bis(2-hydroxyethoxy)benzene and capric acid (compound 27) | 50.0 |
| 35 | B | 2.0 | a | 5.0 | Diester of 1,3-bis(2-hydroxyethoxy)benzene and capric acid (compound 27) | 50.0 |
| 36 | C | 3.0 | a | 5.0 | Diester of 1,3-bis(2-hydroxyethoxy)benzene and capric acid (compound 27) | 50.0 |
| 37 | A | 1.0 | a<br>c | 3.0<br>3.0 | Diester of 1,3-bis(2-hydroxyethoxy)benzene and capric acid (compound 27) | 50.0 |
| 38 | A | 1.0 | a | 5.0 | Diester of 1,3-bis(2-hydroxyethoxy)benzene and undecanoic acid (compound 28) | 50.0 |

TABLE 3-continued

| Ex | Component (I) | Blending Amount | Component (II) | Blending Amount | Component (III) Acid | Blending Amount |
|---|---|---|---|---|---|---|
| 39 | A | 1.0 | a | 5.0 | Diester of 1,3-bis(2-hydroxyethoxy)benzene and lauric acid (compound 29) | 50.0 |
| 40 | A | 1.0 | a | 5.0 | Diester of 1,3-bis(2-hydroxyethoxy)benzene and tridecanoic acid (compound 30) | 50.0 |
| 41 | A | 1.0 | a | 5.0 | Diester of 1,3-bis(2-hydroxyethoxy)benzene and myristic acid (compound 31) | 50.0 |
| 42 | A | 1.0 | a | 5.0 | Diester of 1,3-bis(2-hydroxyethoxy)benzene and pentadecanoic acid (compound 32) | 50.0 |
| 43 | A | 1.0 | a | 5.0 | Diester of 1,3-bis(2-hydroxyethoxy)benzene and palmitic acid (compound 33) | 50.0 |
| 44 | A | 1.0 | a | 5.0 | Diester of 1,3-bis(2-hydroxyethoxy)benzene and stearic acid (compound 35) | 50.0 |

A of component (I) in the table is 3-(2-ethoxy-4-diethylaminophenyl)-3-(1-ethyl-2-methylindol-3-yl)-4-azaphthalide, B is 1,2-benz-6-(N-ethyl-N-isoamylamino)fluorane, and C is 2-(2-chloroanilino)-6-di-n-butylaminofluorane.

a of component (II) in the table is 2,2-bis(4-hydroxyphenyl)hexafluoropropane, and c is 1,1-bis(4-hydroxyphenyl)-n-decane.

Color changes and values of $T_1$, $T_2$, $T_3$, $T_4$, $T_H$, $T_G$ and $\Delta H$ of the thermochromic color-memory microcapsule pigments of Examples 19 to 44 are shown in the following Table.

TABLE 4

| Example | Color Change Coloring ↔ Decoloring | Discoloration Characteristics (° C.) | | | | | | |
|---|---|---|---|---|---|---|---|---|
| | | $T_1$ | $T_2$ | $T_3$ | $T_4$ | $T_H$ | $T_G$ | $\Delta H$ |
| 19 | Blue ↔ Colorless | −14 | −4 | 54 | 74 | −9 | 64 | 73 |
| 20 | Blue ↔ Colorless | −1 | 9 | 47 | 69 | 4 | 58 | 54 |
| 21 | Blue ↔ Colorless | −4 | 4 | 62 | 82 | 0 | 72 | 72 |
| 22 | Pink ↔ Colorless | −3 | 3 | 58 | 80 | 0 | 69 | 69 |
| 23 | Black ↔ Colorless | −3 | 3 | 56 | 80 | 0 | 68 | 68 |
| 24 | Blue ↔ Colorless | −7 | 1 | 58 | 80 | −3 | 69 | 72 |
| 25 | Blue ↔ Colorless | −2 | 4 | 59 | 77 | 1 | 68 | 67 |
| 26 | Blue ↔ Colorless | 4 | 12 | 67 | 81 | 8 | 74 | 66 |
| 27 | Blue ↔ Colorless | 9 | 15 | 66 | 80 | 12 | 73 | 61 |
| 28 | Blue ↔ Colorless | 12 | 20 | 67 | 83 | 16 | 75 | 59 |
| 29 | Blue ↔ Colorless | 16 | 26 | 70 | 84 | 21 | 77 | 56 |
| 30 | Blue ↔ Colorless | 16 | 26 | 74 | 84 | 21 | 79 | 58 |
| 31 | Blue ↔ Colorless | 37 | 45 | 71 | 77 | 41 | 74 | 33 |
| 32 | Blue ↔ Colorless | −16 | −8 | 38 | 52 | −12 | 45 | 57 |
| 33 | Blue ↔ Colorless | −24 | −12 | 43 | 59 | −18 | 51 | 69 |
| 34 | Blue ↔ Colorless | −9 | −1 | 53 | 63 | −5 | 58 | 63 |
| 35 | Pink ↔ Colorless | −6 | 2 | 48 | 60 | −2 | 54 | 56 |
| 36 | Black ↔ Colorless | −9 | 1 | 46 | 62 | −4 | 54 | 58 |
| 37 | Blue ↔ Colorless | −4 | 0 | 49 | 63 | −2 | 56 | 58 |
| 38 | Blue ↔ Colorless | −8 | 4 | 60 | 70 | −2 | 65 | 67 |
| 39 | Blue ↔ Colorless | 1 | 13 | 65 | 77 | 7 | 71 | 64 |
| 40 | Blue ↔ Colorless | 14 | 24 | 70 | 78 | 19 | 74 | 55 |
| 41 | Blue ↔ Colorless | 9 | 25 | 73 | 81 | 17 | 77 | 60 |
| 42 | Blue ↔ Colorless | 28 | 40 | 76 | 84 | 34 | 80 | 46 |
| 43 | Blue ↔ Colorless | 32 | 48 | 76 | 84 | 40 | 80 | 40 |
| 44 | Blue ↔ Colorless | 42 | 58 | 82 | 90 | 50 | 86 | 36 |

Application Example 1

A thermochromic color-memory liquid composition (paint) was prepared by homogeneously dispersing 2.5 parts of the thermochromic color-memory microcapsule pigment prepared in Example 21 and 1.5 parts of a non-thermochromic fluorescent pink pigment into an oily ink vehicle composed of 12.5 parts of vinyl chloride-vinyl acetate copolymer resin, 38.3 parts of xylene, 45 parts of butyl acetate, and 0.2 parts of a viscosity regulator.

After the obtained paint was cooled to a temperature of −4° C. or lower to change the color to purple, the paint was applied to a plug part (white) of a domestic electric code by spraying to provide a reversible thermochromic layer, whereby a thermochromic color-memory plug was obtained.

The plug showed purple at room temperature (25° C.) but the plug became pink at a temperature of 82° C. or higher by heating. When the plug was cooled from the discolored state, the plug again became purple at a temperature of −4° C. or lower.

When the thermochromic color-memory plug turned to pink at a temperature of 82° C. or higher, it can maintain the pink discolored state unless it was cooled to a temperature of −4° C. or lower. Accordingly, it was possible to visually detect temperature history in the case where the plug was abnormally overheated and reached a high-temperature region of 82° C. or higher.

Application Example 2

Figure 2:
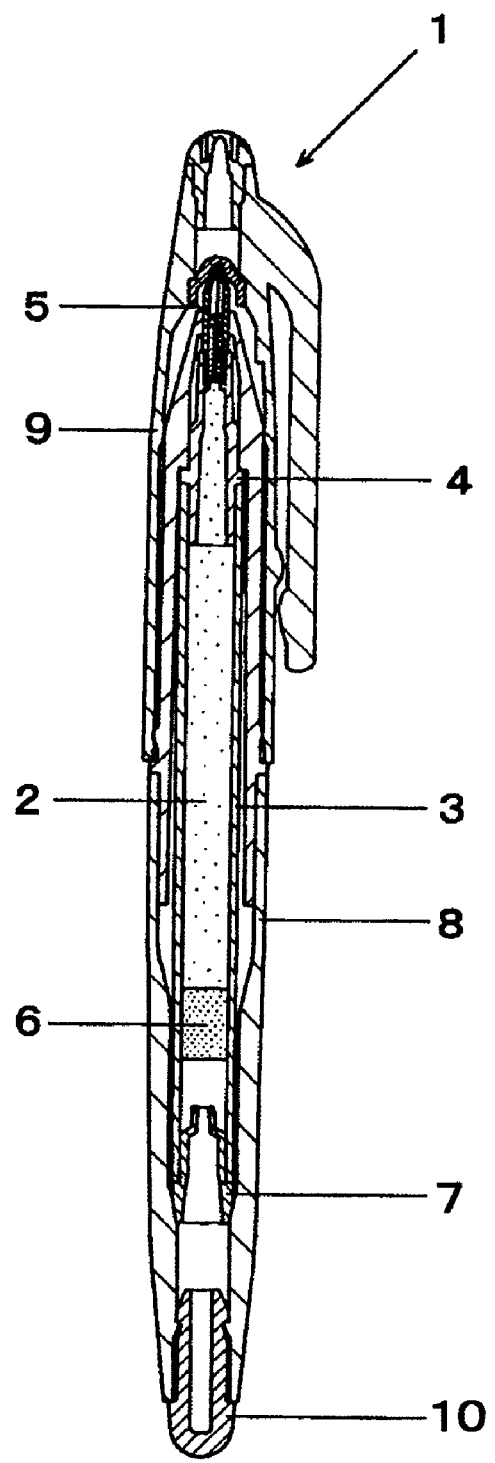
FIG. 2 is a longitudinal sectional view of a writing implement using the thermochromic color-memory microcapsule pigment of the present invention.

Referring to FIG. 2

A thermochromic color-memory liquid composition (ink 2 for writing implement) was prepared by homogeneously dispersing 27 parts of the thermochromic color-memory microcapsule pigment prepared in Example 33 (blue color had been developed beforehand by cooling to −24° C. or lower) into an aqueous ink vehicle composed of 0.33 parts of xanthan gum (shear thinning agent), 10.0 parts of urea, 10 parts of glycerin, 0.6 parts of a nonionic surfactant, 0.1 parts of a modified silicone antifoaming agent, 0.2 parts of an antiseptic and 51.77 parts of water.

Preparation of Writing Implement

An ink receiving tube 3 made of a polypropylene pipe was filled by suction with the above ink 2 and connected, via a holder 4 made of a resin, with a ball-point pen tip 5 holding a 0.7 mm stainless steel ball on its front end.

Next, an ink follower (liquid plug) 6 containing polybutene as a main component and having viscoelasticity was filled from the rear end of the polypropylene pipe, and a tail plug 7 was fitted in the rear portion of the pipe. An axle body 8 composed of a front axle body and a rear axle body was assembled, a cap 9 was fitted, and then degassing treatment was carried out by centrifugation, whereby a writing implement (ball-point pen) 1 was obtained.

The rear portion of the above rear axle body has a rubber made of SEBS attached as a frictional member 10.

Using the obtained ball-point pen, a blue letter (handwriting) was formed by writing on a sheet of paper. The handwriting showed blue at room temperature (25° C.), but the letter discolored and became colorless when the letter was rubbed using the frictional body. This state was kept under room temperature.

When the sheet of paper was put in a freezer and cooled to −24° C. or lower after the discoloration, the letter showed a color changing behavior that the letter turned to blue again. The behavior was reproduced repeatedly.

Application Example 3

Figure 3:
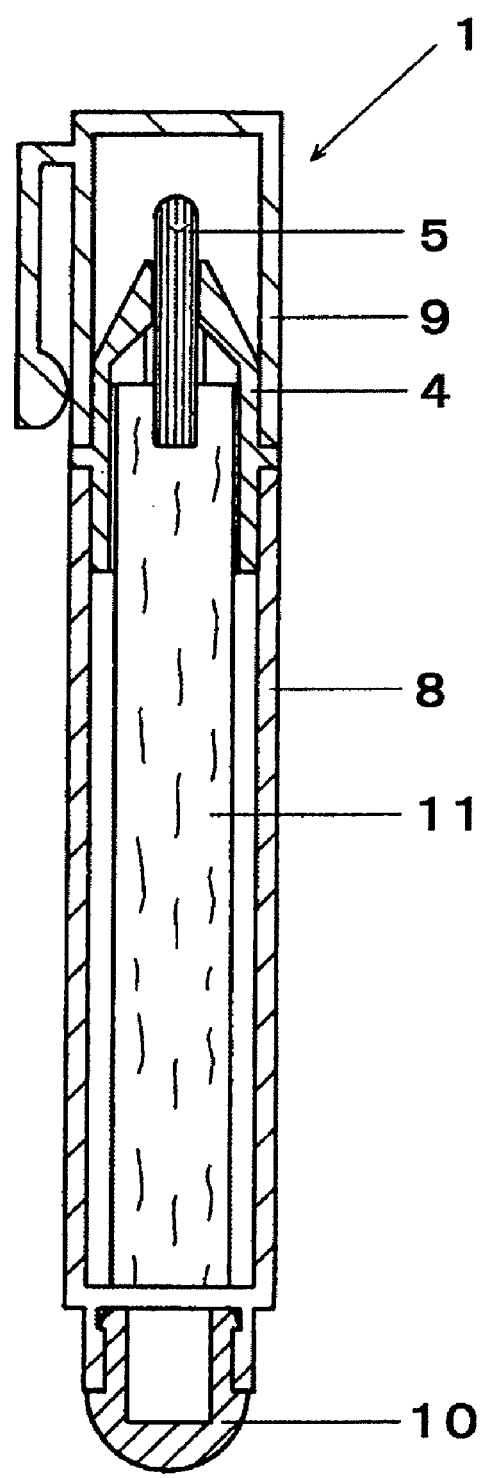
FIG. 3 is a longitudinal sectional view of a writing implement using the thermochromic color-memory microcapsule pigment of the present invention.

Referring to FIG. 3

A thermochromic color-memory liquid composition (ink for writing implement) was prepared by mixing 25 parts of the thermochromic color-memory microcapsule pigment prepared in Example 35 (pink color had been developed beforehand by cooling to −6° C. or lower), 0.5 parts of hydroxyethyl cellulose, 0.2 parts of comb type polymer dispersant (trade name: Solsperse 43000, manufactured by Lubrizol, Co., Ltd. in Japan), 1.0 parts of an organic nitrogen sulfur compound (trade name: Hokuside R-150, a mixture of 2-methyl-4-isothiazolin-3-one and 5-chloro-2-methyl-4-isothiazolin-3-one, manufactured by Hokko Chemical Industry, Co., Ltd.), 0.5 parts of polyvinyl alcohol, 25.0 parts of glycerine, 0.02 parts of an antifoaming agent, and 47.78 parts of water.

Preparation of Writing Implement

An ink occlusion body 11, in which a polyester sliver was coated with a synthetic resin film, was immersed with the above ink composition, and received in an axle body 8 made of a polypropylene resin, and assembled with a marking pen tip (chisel-type) 5 of polyester fiber on the front end of the axle body via a holder 4 in the connected state, and a cap 9 was fitted, whereby a writing implement 1 (marking pen) was obtained.

The writing implement had an SEBS resin as a frictional member 10 provided to the rear end of the axle body.

Using the above marking pen, a pink letter (handwriting) was formed by writing on a sheet of paper.

The above handwriting showed pink at room temperature (25° C.), but the letter discolored and became colorless when the letter was rubbed using the frictional body. This state was kept under room temperature.

When the sheet of paper was put in a freezer and cooled to −6° C. or lower after the discoloration, the letter showed a color changing behavior that the letter turned to pink again. The behavior was reproduced repeatedly.

Application Example 4

A thermochromic color-memory liquid composition (printing ink) was prepared by homogeneously dispersing 40 parts of the thermochromic color-memory microcapsule pigment prepared in Example 23 (black color had been developed beforehand by cooling to −3° C. or lower) into an aqueous ink vehicle composed of 50 parts of a urethane resin emulsion, 1 part of an antifoaming agent, 1 part of a viscosity regulator and 8 parts of water.

The above ink was applied on an A4 size white synthetic paper (thickness: 200 μm) for coating to provide a reversible thermochromic layer having a thickness of 20 whereby a thermochromic color-memory recording material was obtained.

A letter was printed on the above recording material by a thermal printer (product number: S4870, manufactured by Showa Information Systems Co., Ltd.), and the resulting recording material was put into practical use as a guide board.

A white letter with a black background was clearly visually recognized on the guide board. The discolored state could be maintained under room temperature and the above letter could be kept under room temperature.

With regard to the above-described guide board, it was possible to erase the letter portion by causing color development of the reversible thermochromic layer at the letter portion again by cooling the board to −3° C. or lower and it was possible to form a different letter repeatedly by means of the thermal printer.

Application Example 5

On a pink synthetic paper as a support, a reversible thermochromic screen ink that was prepared by mixing and agitating 45 parts of the thermochromic color-memory microcapsule pigment prepared in Example 21, 44 parts of an acrylic ester emulsion (solid content: 50%), 1 part of a silicone-based antifoaming agent, 4 parts of water, 2 parts of ethylene glycol, 2 parts of a viscosity agent, and 2 parts of an isocyanate-based crosslinking agent was solid printed on the entire surface thereof with a 109 mesh screen plate, and dried and hardened at 130° C. for 5 min, whereby a reversible thermochromic layer was formed.

In a state where the support and the reversible thermochromic layer were laminated, if the layers were cooled to −4° C. or less, a purple color obtained by mixing a pink color of the support and a blue color of the reversible thermochromic layer was visually observed, and if the layers were heated to 82° C. or higher, the reversible thermochromic layer became colorless, such that the pink color of the support was visually observed.

Next, an ink for white screen printing that was prepared by homogeneously mixing and agitating 15 parts of a fine powder silica (trade name: Nipseal E-200, manufactured by Nippon Silica Kogyo, Co., Ltd.), 30 parts of an acrylic ester emulsion (solid content: 50%), 47.5 parts of water, 0.5 parts of a silicon-based antifoaming agent, 3 parts of a viscosity agent for aqueous ink, 1 part of ethylene glycol, and 3 parts of a block isocyanate-based crosslinking agent was solid printed on the entire surface of the above reversible thermochromic layer with a 180 mesh screen plate, and dried and hardened at 130° C. for 5 min to form a white porous layer in a dry state, whereby a color-changeable coaster was formed.

The porous layer was changed from a white state to a colorless transparent state by attachment of water.

If after the color-changeable coaster is cooled to −4° C. or less, water at 5° C. is attached thereto, the porous layer showing white color in the dry state becomes transparent by absorption of water, the purple color obtained by mixing the pink color of the support of the lower layer and the blue color of the reversible thermochromic layer is visually observed.

In the state where water was attached, the above behavior was showed, but if water was vaporized, the entire surface thereof became white again.

Next, if after the color-changeable coaster is heated to 82° C. or more, water at 5° C. is attached thereto, the porous layer showing the white color in the dry state becomes transparent by absorption of water, and the pink color by the support of the lower layer is visually observed.

In the state where water was attached, the above behavior was showed, but if water was vaporized, the entire surface thereof became white again.

A change of the above behavior was able to be implemented repeatedly by attachment of water.

Application Example 6

The thermochromic color-memory microcapsule pigment prepared in Example 24 (13 parts), 84.5 parts of a polyester resin having a softening point of 70° C. as a binder resin, 2.5 parts of a low molecular weight polyethylene as a release agent were mixed, melt-kneaded by using a twin-screw extruder at a kneading temperature of 90° C., cooled, solidified, and then, pulverized and classified to obtain the thermochromic coloring color-memory toner having the particle diameter of 7 μm. The toner particle has a softening point of 73° C.

The obtained thermochromic color-memory toner (blue color had been developed beforehand by cooling to −7° C. or lower) was received in a cartridge.

The cartridge was set on a laser printer and meeting materials were copied to form a thermochromic image, whereby a thermochromic copied matter was obtained.

On the obtained copied matter, a blue thermochromic image was visually observed at room temperature (25° C.). When the copied matter was heated to 80° C. or higher, the thermochromic image was discolored, and even though the copied matter was returned to a state of a room temperature (25° C.), the state in which the thermochromic image was discolored (seemingly non-printed recording paper) was maintained.

By again performing copying with setting the above recording paper on the laser printer, it was possible to form another thermochromic image to obtain a printed matter and thus the recording paper could be used repeatedly.

Application Example 7

Figure 4:
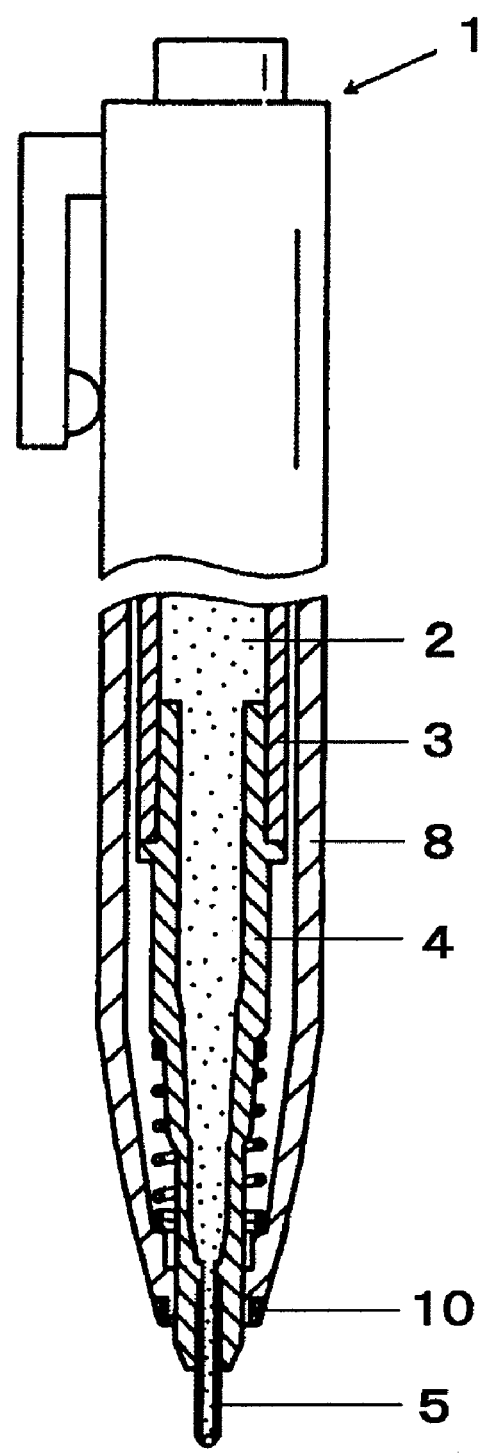
FIG. 4 is a longitudinal sectional view of a writing implement using the thermochromic color-memory microcapsule pigment of the present invention.

(Referring to FIG. 4)

A thermochromic color-memory liquid composition (ink for writing implement) was prepared by homogeneously dispersing 27 parts of the thermochromic color-memory microcapsule pigment prepared in Example 33 (blue color had been developed beforehand by cooling to −24° C. or lower) into an aqueous ink vehicle composed of 0.33 parts of xanthan gum (shear thinning agent), 10.0 parts of urea, 10 parts of glycerin, 0.6 parts of a nonionic surfactant, 0.1 parts of a modified silicone antifoaming agent, 0.2 parts of an antiseptic and 51.77 parts of water.

Preparation of Writing Implement

An ink receiving tube 3 made of a polypropylene pipe was filled by suction with the above ink 2 and connected, via a holder 4 made of a resin, with a ball-point pen tip 5 holding a 0.7 mm stainless steel ball on its front end.

Next, an ink follower (liquid plug) containing polybutene as a main component and having viscoelasticity was filled from the rear end of the polypropylene pipe, whereby a ball-point pen refill was obtained.

The ball-point pen refill was provided in an axle body 8, to thereby obtain a writing implement 1 (in-and-out type ball-point pen).

The in-and-out type ball-point pen had a structure in which the ball-point pen tip was received in the axle body in a state of being exposed to the external air, and the front end of the ball-point pen tip is protruded from the fore-ended opening part of the axle body by operation of the in-and-out type mechanism (knock mechanism) provided in the rear end of the axle body.

In a state of the front end of the ball-point pen tip was protruded from the opening part of the front end of the axle body by actuation of the in-and-out type mechanism, a blue letter (handwriting) was formed by writing on a sheet of paper.

The above letter discolored and became colorless when the handwriting was rubbed using the frictional member 10 made of a SEBS resin provided around the opening part of the front end of the axle body. This state was kept under room temperature.

When the sheet of paper was put in a freezer and cooled to −24° C. or lower after the discoloration, the letter showed a color changing behavior that the letter turned to blue again. The behavior was reproduced repeatedly.

Application Example 8

Thermochromic color-memory pellets were obtained by melt-mixing 5 parts of the thermochromic color-memory microcapsule pigment prepared in Example 44, 1 part of a dispersant, 0.1 parts of a non-thermochromic pink pigment, and 93.9 parts of polypropylene homopolymer with an extruder at 180° C. Using the above pellets, a plastic cup was molded out by an injection-molding machine at a cylinder temperature of 180° C. The obtained plastic cup showed purple at room temperature (25° C.), but started discoloring at a temperature of 82° C. or higher by heating and became pink at a temperature of 90° C. or higher. When the cup was cooled from the state, the cap started discoloring at a temperature of 58° C. or lower and became purple again at a temperature of 42° C. or lower.

When the above plastic cup was poured with a drink and heated in a microwave oven, the cup was discolored from purple to pink and thus it was possible to easily confirm that the inside drink was heated to a temperature of 90° C. or higher. When the plastic cup discolored to pink by heating was taken out of the microwave oven and allowed to stand at room temperature, the cup was again discolored from pink to purple and thus it was possible to easily confirm that the drink in the cup was cooled to a temperature of 42° C. or lower.

Application Example 9

A thermochromic color-memory ink was prepared by homogeneously dispersing 20 parts of the thermochromic color-memory microcapsule pigment prepared in Example 19 (blue color had been developed beforehand by cooling to −14° C. or lower) into an aqueous ink vehicle composed of 78.0 parts of an acrylic resin emulsion (solid content: 40%) and 2.0 parts of an antifoaming agent.

A forgery judging mark was printed by gravure printing with the above thermochromic color-memory ink on a gift certificate which is a high quality paper printed with a black non-thermochromic ink. The above forgery-judging mark showed blue at room temperature (25° C.) and the color was not changed by body temperature or environmental temperature. However, when it was heated to 74° C. or higher, it became colorless and when cooled to −14° C. or lower, it again became blue.

Since the forgery-judging mark of the gift certificate showed blue and did not discolor in a room temperature range, it was impossible to discriminate it to be a forgery-judging mark but it became colorless when heated to 74° C. or higher, so that it had a forgery-preventing function.

Application Example 10

A thermochromic color-memory ink was prepared by homogeneously dispersing 20 parts of a thermochromic color-memory microcapsule pigment (blue color had been developed beforehand by cooling to −14° C. or lower), which was the same as that in Example 19 except that the average particle diameter was adjusted to 2.5 μm, into an aqueous ink vehicle composed of 5 parts of an styrene-acrylic copolymer resin emulsion (solid content: 45%), 10 parts of glycerin, 0.2 parts of an antiseptic, 0.1 parts of an antifoaming agent and 64.7 parts of water.

The obtained ink was set on an ink-jet recording apparatus and printing was performed on a recording paper to form a thermochromic image, whereby a thermochromic printed matter was obtained.

On the printed matter, a blue thermochromic image was visually observed at room temperature (25° C.). The printed matter was not changed by body temperature or environmental temperature, but when the printed matter was heated to 74° C. or higher, the thermochromic image was decolored, and even though the printed matter was returned to a state of a room temperature range, a state in which the thermochromic image was discolored (seemingly non-printed recording paper) was maintained.

By again performing printing with setting the above recording paper on the ink jet recording apparatus, it was possible to form another thermochromic image to obtain a printed matter and thus the recording paper could be used repeatedly.

It was also possible to additionally write a letter or the like using the thermochromic color-memory ball-point pen obtained in Application Example 2 on the printed matter where the thermochromic image had been formed. Also, by heating the printed matter to 74° C. or higher to discolor the thermochromic image and the additionally written portion and to return the printed matter to a state before use (seemingly non-printed recording paper), it was possible to re-use the recording paper on the ink jet recording apparatus repeatedly.

While the present invention has been described in detail and with reference to the specific embodiments thereof, it will be apparent to one skilled in the art that various changes and modifications can be made therein without departing from the spirit and scope thereof.

The present application is based on Japanese Patent Application No. 2009-115474 filed on May 12, 2009 and Japanese Patent Application No. 2010-86409 filed on Apr. 2, 2010, and the entire contents thereof are incorporated herein by reference.

DESCRIPTION OF REFERENCE NUMERALS AND SIGNS

| | |
|---|---|
| T1: | Complete coloring temperature, |
| T2: | Coloring starting temperature, |
| T3: | Discoloring starting temperature, |
| T4: | Complete discoloring temperature, |
| ΔH: | Hysteresis width, |
| 1: | Writing implement, |
| 2: | Ink, |
| 3: | Ink receiving tube, |
| 4: | Holder, |
| 5: | Tip, |
| 6: | Ink follower, |
| 7: | Tail plug, |
| 8: | Axle body, |
| 9: | Cap, |
| 10: | Frictional member, |
| 11: | Ink absorption body |

The invention claimed is:

1. A reversible thermochromic color-memory composition comprising a solubilized mixture of (I) an electron donating coloring organic compound, (II) an electron accepting compound and (III) an ester compound represented by the following formula (1) as a reaction medium which controls color reactions of the components (I) and (II):

[Chem. 1]

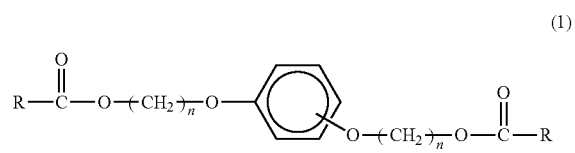

(1)

wherein R represents an alkyl group having 1 to 21 carbon atoms or an alkenyl group having 1 to 21 carbon atoms, and n represents an integer of from 1 to 3.

2. A thermochromic color-memory microcapsule pigment containing the reversible thermochromic color-memory composition of claim 1 encapsulated therein.

3. The thermochromic color-memory microcapsule pigment according to claim 2, wherein the pigment discolors with showing a hysteresis width of from 8° C. to 80° C. regarding a color density-temperature curve.

4. A thermochromic color-memory liquid composition comprising the reversible thermochromic color-memory microcapsule pigment according to claim 2 and a vehicle.

5. A thermochromic color-memory resin composition for molding, comprising the reversible thermochromic color-memory microcapsule pigment according to claim 2 and a resin for molding.

6. A thermochromic color-memory laminate comprising a reversible thermochromic layer in which the thermochromic color-memory microcapsule pigment according to claim 2 is fixed to a resin in a dispersed state, the layer being provided on a support.

* * * * *